(12) United States Patent
Shimoyama et al.

(10) Patent No.: US 7,339,602 B2
(45) Date of Patent: Mar. 4, 2008

(54) IMAGE-DRAWING DEVICE AND IMAGE-DRAWING METHOD

(75) Inventors: Yuji Shimoyama, Kanagawa (JP); Takeshi Fujii, Kanagawa (JP); Daisuke Nakaya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 301 days.

(21) Appl. No.: 10/895,425

(22) Filed: Jul. 21, 2004

(65) Prior Publication Data
US 2005/0052708 A1 Mar. 10, 2005

(30) Foreign Application Priority Data
Jul. 22, 2003 (JP) ............... 2003-277614

(51) Int. Cl.
*B41J 2/45* (2006.01)
*B41J 2/455* (2006.01)
*G03B 27/10* (2006.01)
*G03G 15/04* (2006.01)

(52) U.S. Cl. .................. 347/238; 347/233; 355/84; 399/220

(58) Field of Classification Search ............... 347/238, 347/237, 233; 355/84; 399/220
See application file for complete search history.

(56) References Cited

U.S. PATENT DOCUMENTS 5,754,218 A * 5/1998 Baek et al. ............... 347/240
6,133,986 A   10/2000 Johnson
6,249,306 B1 * 6/2001 Isono et al. .............. 347/233
2001/0055491 A1 * 12/2001 Harada .................... 396/661
2004/0109216 A1 * 6/2004 Nakaya et al. ........... 359/237
2004/0184119 A1 * 9/2004 Nakaya et al. ........... 358/497
2005/0001895 A1 * 1/2005 Uemura et al. ........... 347/235

FOREIGN PATENT DOCUMENTS

JP       2001-500628 A     1/2001
WO       WO 97/34171 A2    9/1997

* cited by examiner

*Primary Examiner*—Stephen Meier
*Assistant Examiner*—Sarah Al-Hashimi
(74) *Attorney, Agent, or Firm*—Sughrue Mion, PLLC

(57) ABSTRACT

An image-drawing device, which carries out image-drawing on the basis of image-drawing data, has image-drawing heads which are moved relatively in a predetermined scanning direction along an image-drawing surface. The image-drawing heads have a large number of image-drawing elements lined-up two-dimensionally within a plane which is parallel to the image-drawing surface. The straight lines along which the plural image-drawing elements are lined-up are inclined, with respect to the scanning direction, at a predetermined inclination angle such that an image-drawing magnification has an effective value after a decimal point. A data allocating unit allocates the image-drawing data to the respective image-drawing elements at predetermined timings corresponding to a resolution determined in accordance with the image-drawing magnification. In this way, resolution in the scanning direction can be increased without making a scanning speed of the image-drawing heads slower or making a modulation speed of the image-drawing elements faster.

20 Claims, 22 Drawing Sheets

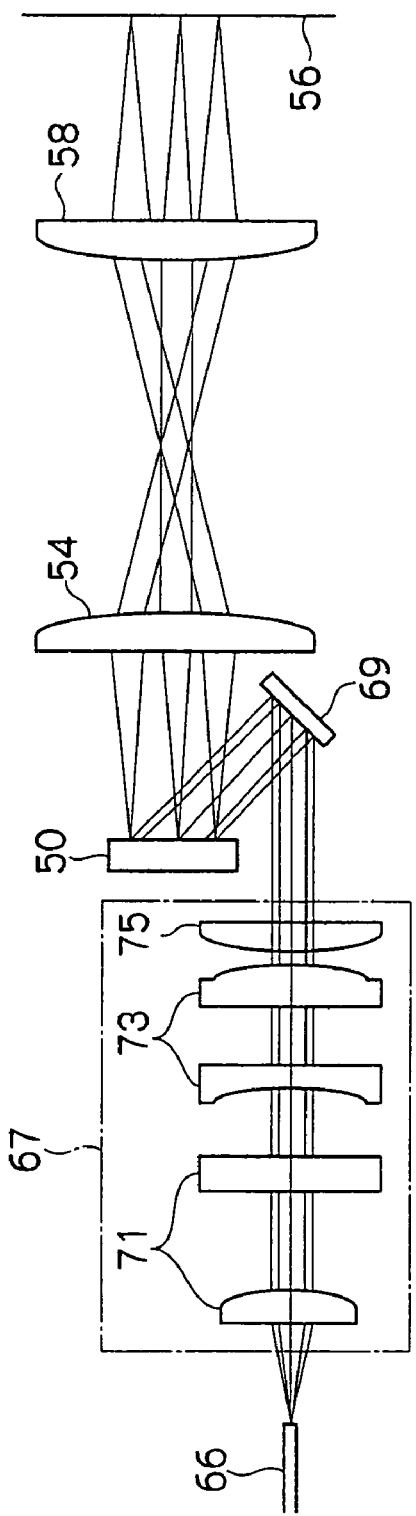
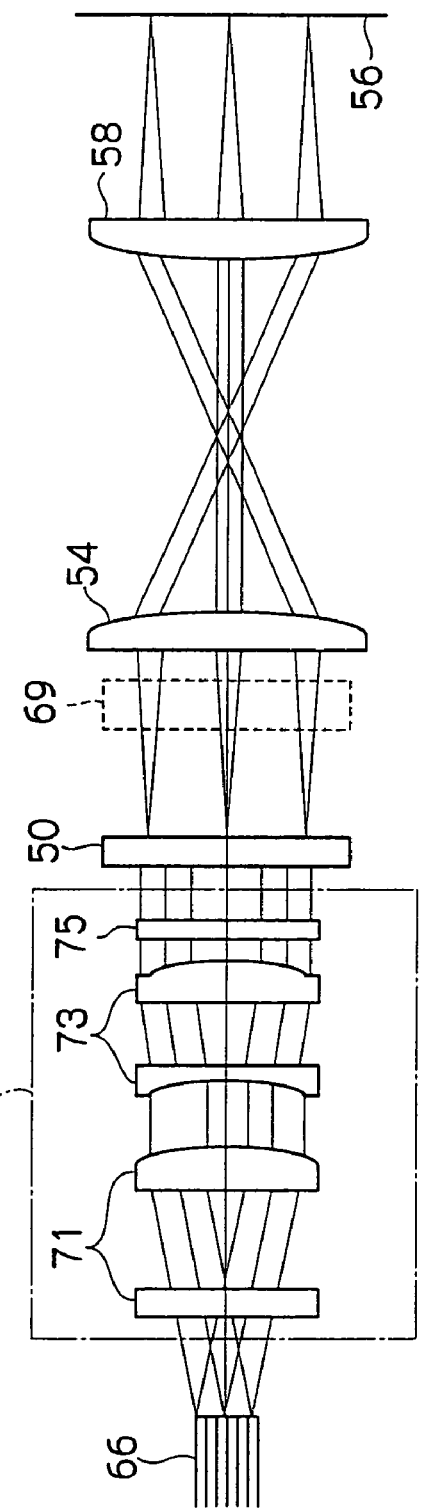
FIG. 6A
FIG. 6B

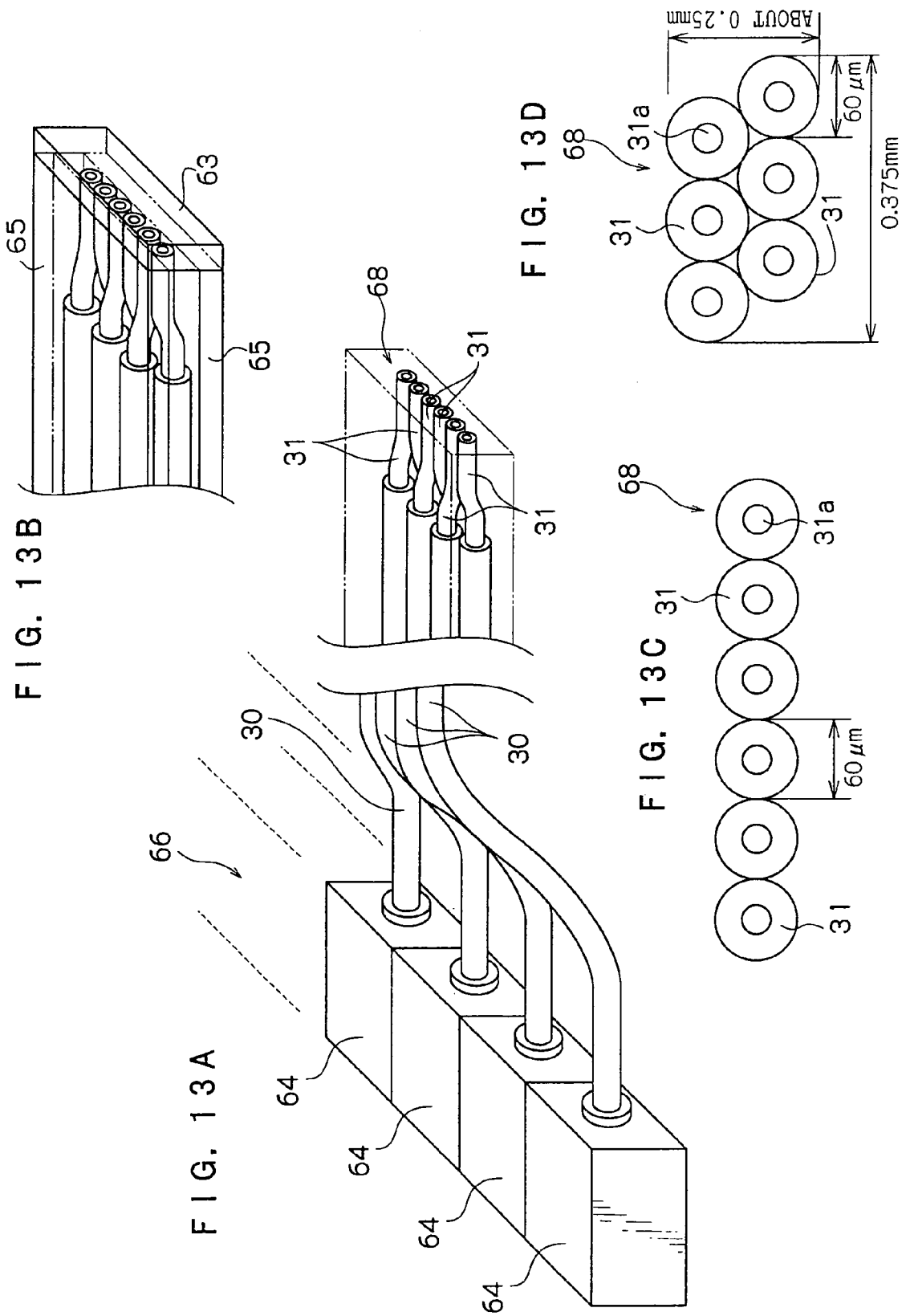

F I G. 18
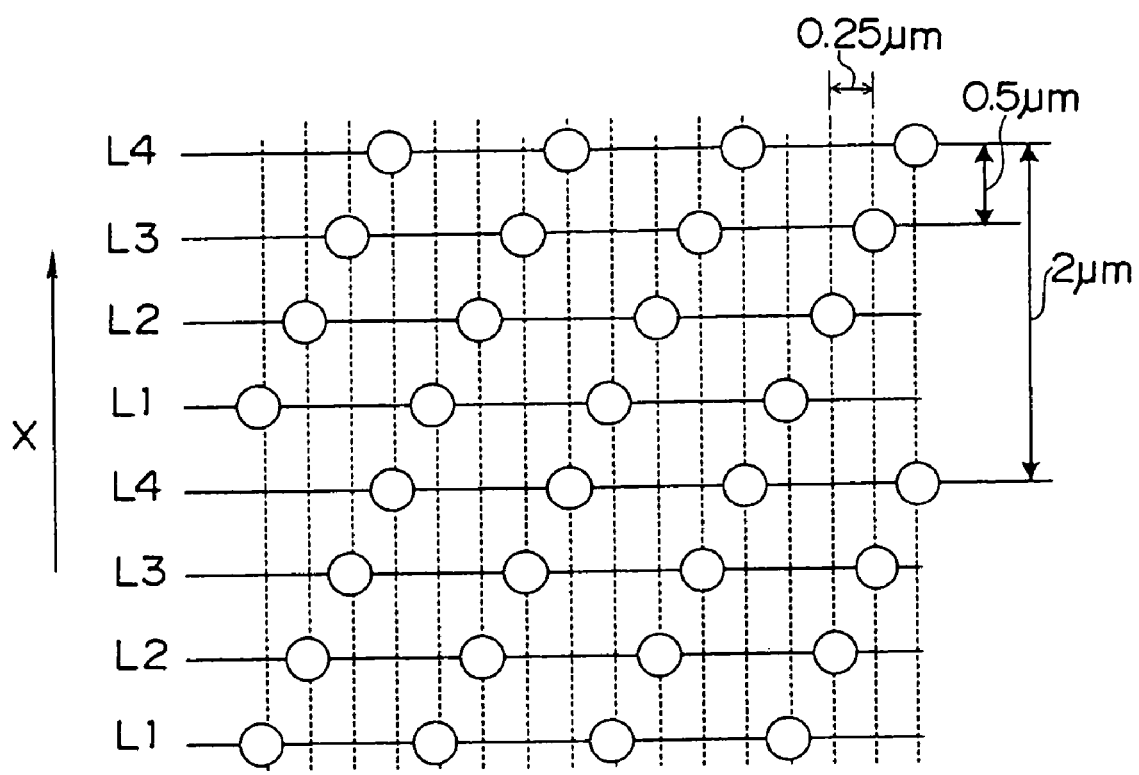

IMAGE-DRAWING DEVICE AND IMAGE-DRAWING METHOD

CROSS-REFERENCE TO RELATED APPLICATION

This application claims priority under 35 USC 119 from Japanese Patent Application No. 2003-277614, the disclosure of which is incorporated by reference herein.

BACKGROUND OF THE INVENTION

1. Field of the Invention

The present invention relates to an image-drawing device and an image-drawing method, and in particular, to an image-drawing device equipped with image-drawing heads which move relative to an image-drawing surface in a predetermined direction along the image-drawing surface, and to an image-drawing method using the image-drawing heads.

2. Description of the Related Art

Conventionally, as an example of an image-drawing device, various exposure devices have been proposed which carry out image exposure by light beams modulated in accordance with image data, by using spatial light modulators (image-drawing elements) such as digital micromirror device (DMDs) or the like. A DMD is a mirror device in which a large number of micromirrors, at which the angles of the reflecting surfaces thereof are varied in accordance with control signals, are lined-up two-dimensionally in L lines×M columns on a semiconductor substrate formed of silicon or the like. Actual exposure is carried out by scanning a DMD in a given direction along an exposure surface.

Generally, the micromirrors of the DMD are arranged such that the direction in which the respective lines are lined-up and the direction in which the respective columns are lined-up are orthogonal to one another. By disposing such a DMD at an incline with respect to the scanning direction, the intervals between the scan lines at the time of scanning can be made to be closer, and the resolution can be increased. For example, Japanese Patent Application National Publication No. 2001-500628 discloses, in an illumination system which guides light to a subregion (a spatial light modulator) provided with a plurality of light valves, increasing the resolution by setting the sub-region at an incline with respect to the projection on the scan lines. In accordance with this method, the resolution in the direction orthogonal to the scanning direction can be increased. However, with respect to the resolution in the direction orthogonal to the scanning direction, because the spatial light modulator is arranged two-dimensionally, although the resolution can be easily increased by adjusting the numbers of lines and columns and the angle of inclination, the resolution may become higher than needed depending on the case.

On the other hand, the resolution in the scanning direction is usually determined by the scanning speed and the modulating speed of the spatial light modulator. Accordingly, in order to increase the resolution in the scanning direction, either the scanning speed must be made to be slower, or the modulating speed of the spatial light modulator must be made to be faster. However, if the scanning speed is made slower, the image-drawing speed becomes slower, and a problem arises in that produceability deteriorates. Further, there are limits to increasing the modulating speed of the spatial light modulator.

SUMMARY OF THE INVENTION

In view of the aforementioned, the present invention provides an image-drawing device and an image-drawing method which can increase the resolution in the scanning direction without making the scanning speed slower or making the modulating speed of an image-drawing element group faster.

A first aspect of the present invention is an image-drawing device having image-drawing heads which are moved relatively in a predetermined scanning direction along an image-drawing surface, and carrying-out image-drawing on the basis of image-drawing data, the device comprising: a plurality of image-drawing elements structured so as to be lined-up two-dimensionally within a plane substantially parallel to the image-drawing surface of the image-drawing heads, and at the image-drawing surface, the plurality of image-drawing elements on the whole structure image-drawing element groups which generate two-dimensional image-drawing pixel groups which are inclined at a predetermined angle of inclination with respect to the scanning direction; an image-drawing magnification setting unit setting an image-drawing magnification such that the image-drawing magnification has an effective value after a decimal point; and a data allocating unit allocating the image-drawing data at predetermined timings to the respective image-drawing elements, so that a resolution becomes a resolution corresponding to the value after the decimal point of the image-drawing magnification. As a result of this allocation, image-drawing data is allocated to respective pixels.

Further, a second aspect of the present invention is an image-drawing method moving image-drawing heads relatively in a predetermined scanning direction along an image-drawing surface, and carrying-out image-drawing on the basis of image-drawing data, the method comprising the steps of: lining-up a plurality of image-drawing elements two-dimensionally and inclined at a predetermined angle of inclination with respect to the scanning direction, within a plane substantially parallel to the image-drawing surface; setting an image-drawing magnification such that the image-drawing magnification has an effective value after a decimal point; and carrying-out image-drawing by allocating the image-drawing data to pixels to be drawn by the respective image-drawing elements, in accordance with the effective value after the decimal point.

In the above-described image-drawing device and image-drawing method, the image-drawing heads are moved relatively in the predetermined scanning direction along the image-drawing surface. Image-drawing (image recording) is carried out on the image-drawing surface by the image-drawing heads on the basis of the image-drawing data.

An image-drawing magnification at the time of image-drawing is set, by the image-drawing magnification setting unit, to have an effective value (a value which is not zero) after the decimal point. This image-drawing magnification is expressed by a value equal to the pixel pitch in the scanning direction being divided by the image-drawing pitch of the image-drawing elements. The image-drawing magnification having a value after the decimal point means that the pixel pitch in the scanning direction is not divisible without a remainder when divided by the image-drawing pitch of the image-drawing elements and a remainder is generated.

Here, the pixel pitch and the image-drawing pitch will be explained. Projection positions H at the time of projecting plural image-drawing elements onto a surface onto which an image is drawn (hereinafter, "drawing surface") are shown in FIG. 20. Each of the projection positions H1 through H9 carries out drawing onto the drawing surface while moving in the scanning direction X. Further, pixel groups, which are structured by pixels I on the drawing surface on which an image is drawn by the image-drawing elements, are shown in FIG. 21. In this drawing, the pixels, which have been drawn in an extremely short period of time and which correspond to the projection positions H, are shown by the solid lines, and the other pixels are shown by the one-dot-chain lines. The pixel pitch means the distance between the projection positions H in the scanning direction X, as shown by P1 in FIGS. 20 and 21. The image-drawing pitch means the distance between the pixels I in the scanning direction X, as shown by P2 in FIG. 21. Usually, image-drawing cannot be carried out in units smaller than the image-drawing pitch. The reason for this is as follows. Let us assume that, for example, the image-drawing element which draws at the left end projection position H1 successively draws a plurality of pixels I1 while moving in the scanning direction X. When the image-drawing magnification is set to an integer, the pixels drawn by the respective image-drawing elements are lined-up in the Y direction (which is orthogonal to the scanning direction), and pixel rows are formed in the Y direction. Because the intervals between these pixel rows coincide with the image-drawing pitch, image-drawing cannot be carried out at a unit smaller than this.

On the other hand, when the image-drawing magnification is set to as to have a value after the decimal point, as shown in FIG. 21, the pixel I1, which is drawn by the image-drawing element corresponding to the projection position H1, and a pixel I2 which is drawn by the image-drawing element, which is adjacent to this image-drawing element in the scanning direction and which draws on the projection position H2, are offset in the scanning direction X, without being lined-up along the Y direction which is orthogonal to the scanning direction. Here, the image-drawing magnification is set as described above, and the image-drawing data is allocated to the pixel I1 and the pixel I2 such that a resolution corresponding to offset Z (which is determined by the image-drawing pitch and the value after the decimal point) is realized. By allocating the data in this way, the amount of information of the projected image can be increased in the direction of arrow X which is the scanning direction (i.e., there is twice the information amount in the example shown in FIG. 21). Accordingly, the resolution in the scanning direction can be increased without slowing the scanning speed or quickening the modulation speed of the image-drawing element group. Further, at the same resolution, the image-drawing speed can be made to be faster.

In the image-drawing device and the image-drawing method of the present invention, for each region to be drawn, the pixels can be grouped together so as to structure a pixel group, and predetermined image-drawing data can be allocated by the data allocating unit so as to correspond to the pixel groups.

In a case in which the resolution of the inputted image-drawing data and the resolution at which image-drawing can be actually carried out differ and the number of pixels to be drawn is large with respect to the input image-drawing data, how to allocate the image-drawing data to the respective pixels becomes problematic. Further, the positions of the pixels to be drawn by the image-drawing elements are determined in accordance with the image-drawing magnification. However, in order to accurately set the image-drawing magnification, the mounting accuracy and the like of the respective parts must be increased, and the costs increase. Thus, the pixels to be drawn are grouped together for each region to be drawn, and predetermined image-drawing data is allocated so as to correspond to the grouped pixel groups. In this way, even in a case in which errors arise in the image-drawing magnifications, image-drawing corresponding to the predetermined image-drawing data can be carried out.

The setting of the image-drawing magnification in the image-drawing device and the image-drawing method of the present invention can be carried out by varying the time of the image-drawing element from one image-drawing to the next image-drawing, or can be carried out by varying the relative moving speed of the image-drawing head.

Further, this setting can be carried out by varying the focusing magnification for focusing light from the image-drawing elements of the image-drawing heads onto the image-drawing surface.

As described above, the image-drawing magnification is a value equal to the pixel pitch divided by the image-drawing pitch, and therefore, can be set by varying the pixel pitch and/or the image-drawing pitch. The pixel pitch here is varied by varying the focusing magnification of the focusing unit. Further, the image-drawing pitch is expressed as T×V, where T is the time from one image-drawing to the next image-drawing of the image-drawing element, and V is the relative moving speed of the image-drawing head. Accordingly, by varying at least one of the focusing magnification of the focusing unit, and the time of the image-drawing element from one image-drawing to the next image-drawing and the relative moving speed of the image-drawing head, the pixel pitch or the image-drawing pitch can be varied, and the image-drawing magnification can be set.

Further, the image-drawing heads which structure the image-drawing device of the present invention, or the image-drawing heads which are used in the image-drawing method of the present invention may be inkjet recording heads which expel ink drops onto the image-drawing surface in accordance with image information, or may be image-drawing heads which are modulated light illuminating devices which illuminate, onto an exposure surface which serves as the image-drawing surface, light which has been modulated pixel-by-pixel in accordance with the image-drawing data. In this image-drawing head, the light, which has been modulated pixel-by-pixel in accordance with the image data, is illuminated onto an exposure surface, which is the image-drawing surface, from the modulated light illuminating devices. Then, by moving these image-drawing heads relative to the exposure surface in a direction along the exposure surface, a two-dimensional image is drawn onto the exposure surface.

An example of the modulated light illuminating device is a two-dimensionally arranged light source in which a large number of point light sources are lined-up two-dimensionally. In such a structure, the respective point light sources emit light in accordance with image data. This light is, as needed, guided to a predetermined position by a light guiding member such as a high-intensity fiber or the like, and further, is, as needed, shaped or the like by an optical system such as lenses and mirrors or the like, and is illuminated onto the exposure surface.

The modulated light illuminating device may be structured so as to include: a laser device illuminating laser light; a spatial light modulator at which a large number of image-drawing elements, whose light modulating states vary in accordance with control signals, are lined-up two-dimensionally, and which modulates the laser light illuminated from the laser device; and a control unit controlling the image-drawing element groups by control signals generated in accordance with exposure information. In this structure, the light modulating states of the respective image-drawing elements of the spatial light modulator are varied by the control unit. The laser light, which is illuminated onto the spatial light modulator, is modulated, and is illuminated onto the exposure surface. Of course, as needed, a light guiding member such as a high-intensity fiber or the like, or an optical system such as lenses, mirrors and the like, may be used.

A micromirror device, which is structured by two-dimensionally arranging a large number of micromirrors at which the angles of the reflecting surfaces thereof can be changed in accordance with respective control signals, can be used as the spatial light modulator. Or, a liquid crystal shutter array, which is formed by two-dimensionally arranging a large number of liquid crystal cells which can block incident light (transmitted light) in accordance with respective control signals, can be used as the spatial light modulator.

BRIEF DESCRIPTION OF THE DRAWINGS

FIG. 6A is a sectional view of a subscanning direction along an optical axis in the structure of the exposure head shown in FIG. 5, and FIG. 6B is a side view of FIG. 6A.

FIG. 13A is a perspective view showing the structure of a fiber array light source, FIG. 13B is a partial enlarged diagram of FIG. 13A, and FIGS. 13C and 13D are plan views showing arrangements of light-emitting points at a laser exiting portion.

FIG. 18 is a drawing showing a portion of another example of an exposure region exposed by the DMD of the embodiment.

DETAILED DESCRIPTION OF THE INVENTION

Figure 1:
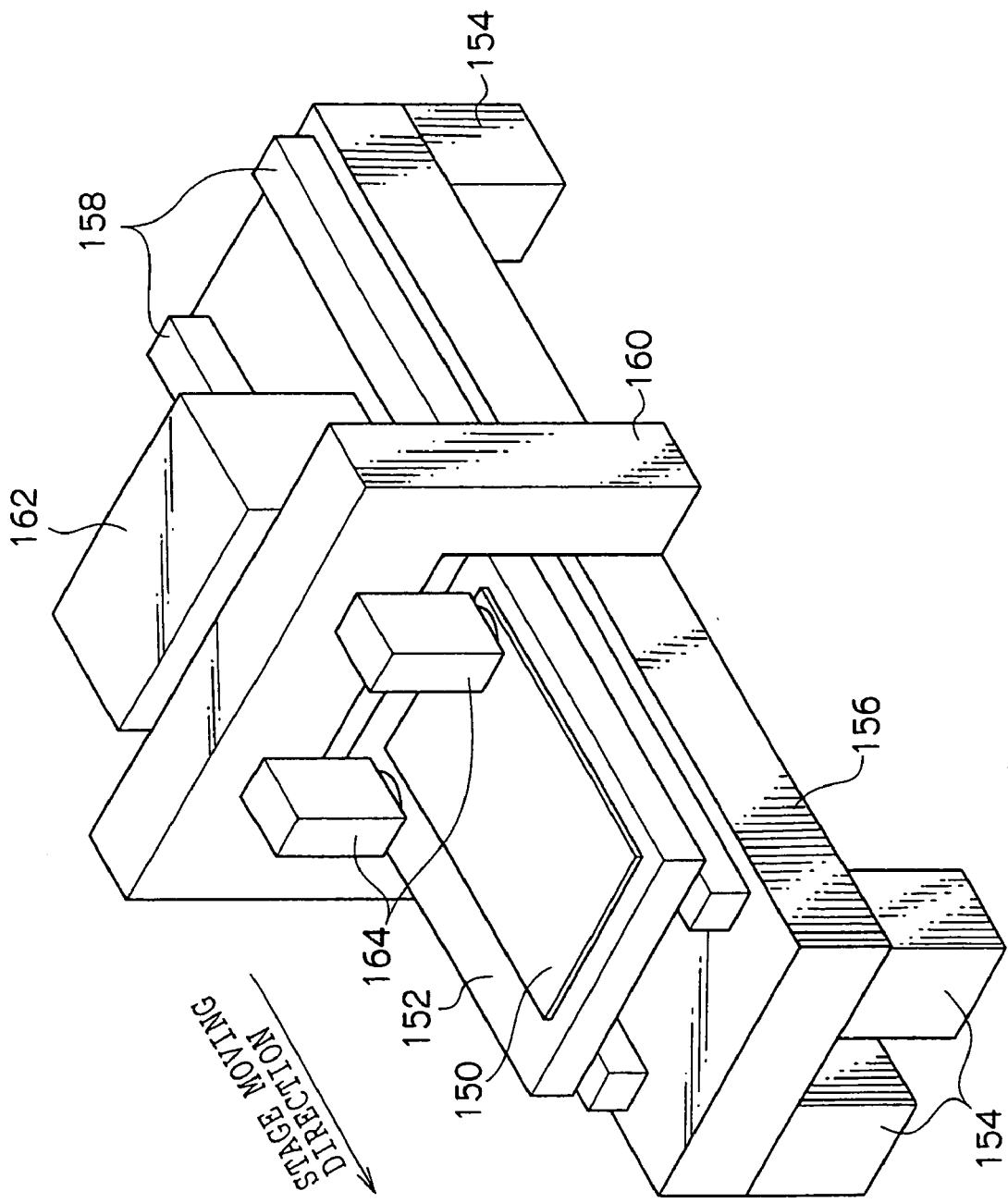
FIG. 1 is a perspective view showing the exterior of an exposure device of an embodiment of the present invention.

The image-drawing device relating to an embodiment of the present invention is a so-called flatbed-type exposure device. As shown in FIG. 1, the exposure device has a stage 152 which is shaped as a flat plate, and which sucks and holds a sheet-like photosensitive material 150 to the surface of the stage 152. Two guides 158, which extend along the stage moving direction, are set at the top surface of a setting stand 156 which is shaped as a thick plate and is supported by four leg portions 154. The stage 152 is disposed such that the longitudinal direction thereof is oriented in the stage moving direction, and is supported by the guides 158 so as to be reciprocatingly movable.

Figure 2:
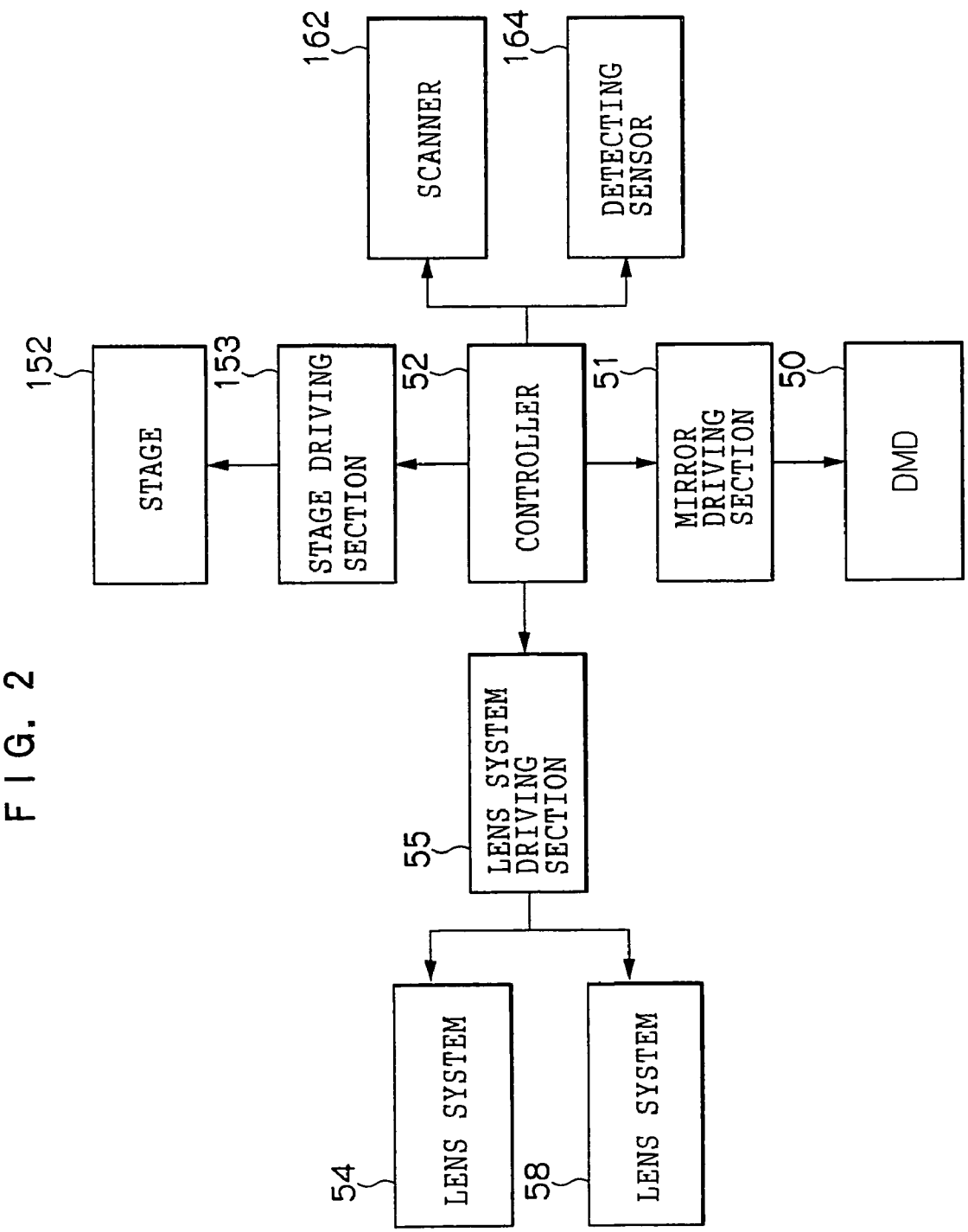
FIG. 2 is a schematic block diagram of a control system of the exposure device of the embodiment.

A schematic block diagram of the control system of the exposure device is shown in FIG. 2. The stage 152 is connected to a stage driving section 153 which is for driving the stage 152 along the guides 158. The stage driving section 153 is connected to a controller 52 which outputs drive signals. The controller 52 is structured so as to include a CPU, a ROM, a RAM, various types of memories, an input section, and the like, and can output control signals at the time of carrying out control of the respective sections of the exposure device. The moving speed of the stage 152 in the scanning direction (scanning speed V) is controlled by a stage driving signal from the controller 52.

As shown in FIG. 1, a U-shaped gate 160 is provided at the central portion of the setting stand 156 so as to straddle over the path of movement of the stage 152. The end portions of the U-shaped gate 160 are fixed to the both side surfaces of the setting stand 156. A scanner 162 is provided at one side of the gate 160. A plurality of (e.g., two) detecting sensors 164, which detect the leading end and the trailing end of the photosensitive material 150, are provided at the other side of the gate 160. The scanner 162 and the detecting sensors 164 are respectively mounted to the gate 160, and are disposed so as to be fixed above the path of movement of the stage 152. Note that the scanner 162 and the detecting sensors 164 are connected to the controller 52 as shown in FIG. 2, and are controlled so as to expose at predetermined times when exposure is carried out by exposure heads 166.

Figure 3:
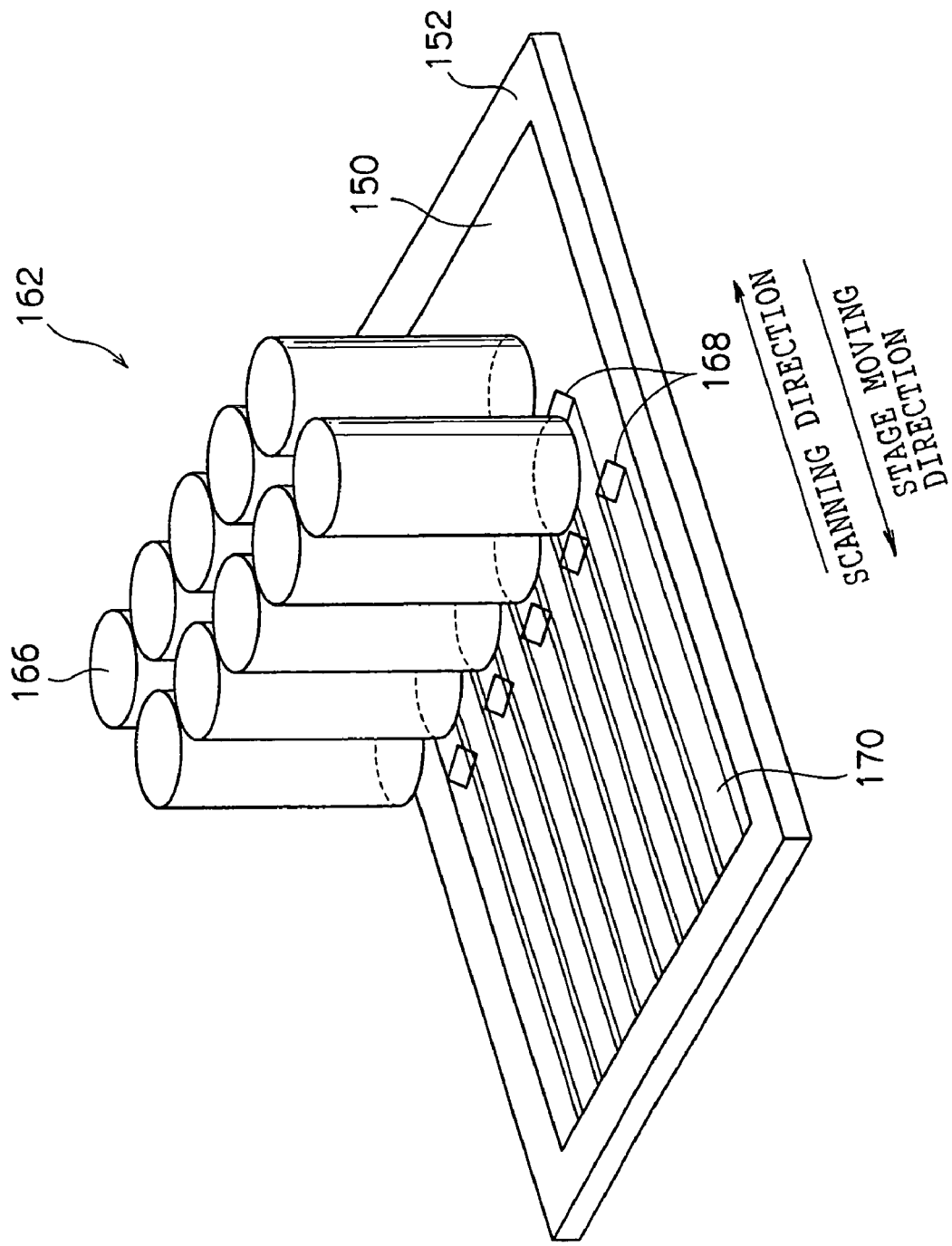
FIG. 3 is a perspective view showing the structure of a scanner of the exposure device of the embodiment.
Figure 4A:
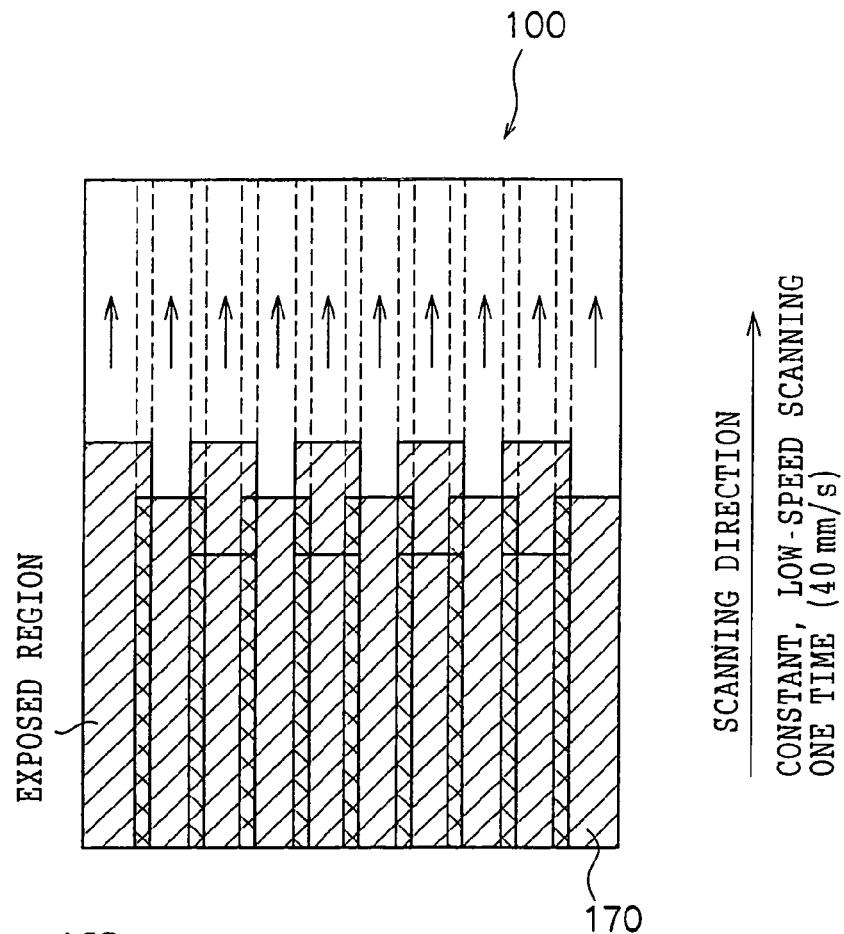
FIG. 4A is a plan view showing exposed regions formed on a photosensitive material.
Figure 4B:
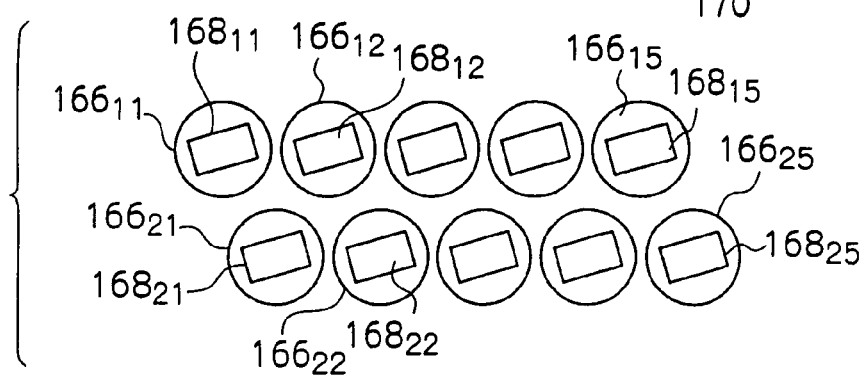
FIG. 4B is a diagram showing the arrangement of exposure areas of respective exposure heads.

As shown in FIGS. 3 and 4B, the scanner 162 has the plurality of exposure heads 166 which are arranged in a substantial matrix form of m lines and n columns (e.g., two lines and five columns). In the present embodiment, due to the relationship with the width of the photosensitive material 150, five exposure heads 166 are disposed in each of the first line and the second line for a total of 10 exposure heads 166. Note that when the individual exposure head disposed in the mth line and nth column is referred to, it will be called exposure head $166_{mn}$.

In FIG. 3, an exposure area 168 of the exposure head 166 is in the shape of a rectangle whose short side runs along the scanning direction. The exposure areas 168 are inclined at a predetermined angle of inclination with respect to the direction in which the heads are lined-up. As the stage 152 moves, a strip-shaped exposed region 170 is formed by each exposure head 166 on the photosensitive material 150. Note that when the individual exposure area of the exposure head of the mth line and nth column is referred to, it will be called exposure area 168$_{mn}$.

As shown in FIGS. 4A and 4B, the exposure heads of each line, which are lined-up linearly, are disposed so as to be offset by a predetermined interval in the direction in which the heads are lined-up, so that the respective strip-shaped exposed regions 170 partially overlap with their adjacent exposed regions 170. Therefore, the portion which cannot be exposed between the exposure area 168$_{11}$ and the exposure area 168$_{12}$ of the first line can be exposed by the exposure area 168$_{21}$ of the second line.

Figure 5:
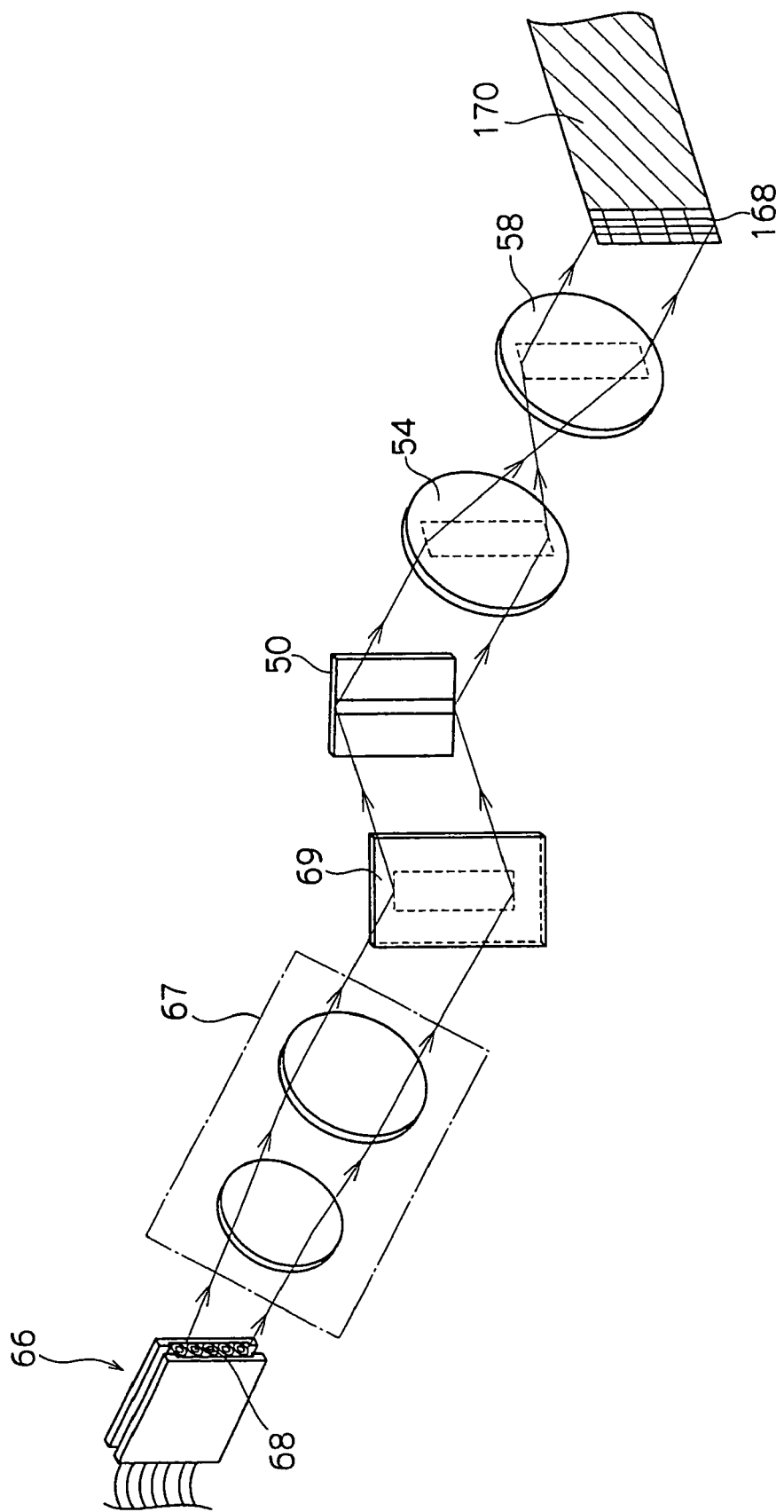
FIG. 5 is a perspective view showing the schematic structure of the exposure head of the embodiment.

As shown in FIGS. 5, 6A and 6B, each of the exposure heads 166$_{11}$ through 166$_{mn}$ has a digital micromirror device (DMD) 50 serving as a spatial light modulator which modulates the incident light beam on a pixel-by-pixel basis and in accordance with image data. As shown in FIG. 2, the DMD 50 is connected to a mirror driving section 51, and the mirror driving section 51 is connected to the controller 52. On the basis of inputted image data, the controller 52 generates mirror control signals which drive and control the respective micromirrors within the region to be controlled of the DMD 50 for each of the exposure heads 166. This image data conversion can be conversion which includes enlargement or reduction of the image data.

Further, at the mirror driving section 51, the angles of the reflecting surfaces of the respective micromirrors of the DMD are controlled for each of the exposure heads 166 on the basis of the mirror control signals.

A fiber array light source 66, a lens system 67, and a mirror 69 are disposed in that order at the light incident side of the DMD 50. The fiber array light source 66 has a laser exiting portion at which the light exiting end portions (light-emitting points) of optical fibers are lined up in one row along a direction corresponding to the direction of the long side of the exposure area 168. The lens system 67 corrects the laser light exiting from the fiber array light source 66, and condenses it on the DMD. The mirror 69 reflects the laser light, which has passed through the lens system 67, toward the DMD 50.

The lens system 67 is structured by a pair of combination lenses 71, a pair of combination lenses 73, and a condenser lens 75. The pair of combination lenses 71 make the laser light exiting from the fiber array light source 66 into parallel ray. The pair of combination lenses 73 carry out correction such that the light amount distribution of the laser light which have been made into parallel ray is uniform. The condenser lens 75 condenses the laser light, whose light amount distribution has been corrected, on the DMD. The combination lenses 73 have the following functions: with regard to the direction in which the laser exiting ends are lined up, the portions of the combination lenses 73 near to the optical axis of the lenses widen the luminous flux, and the portions away from the optical axis narrow the luminous flux, whereas, with regard to the direction perpendicular to the lined-up direction, the combination lenses 73 make the light pass through as is. The combination lenses 73 correct the laser light such that the light amount distribution thereof becomes uniform.

Lens systems 54, 58 are disposed at the light reflecting side of the DMD 50. The lens systems 54, 58 focus the laser light, which has been reflected at the DMD 50, onto a scan surface (surface-to-be-exposed) 56 of the photosensitive material 150. As shown in FIG. 2, the lens systems 54, 58 are connected to a lens system driving section 55, and the lens system driving section 55 is connected to the controller 52. Lens system driving signals, which move the lens systems 54, 58 in order to focus the laser light, which has been reflected at the DMD 50, onto the scan surface 56 at a predetermined magnification, are outputted from the controller 52. The lens system driving section 55 controls the lens systems 54, 58 on the basis of these lens system driving signals.

The present embodiment is set such that the laser light exiting from the fiber array light source 66 is enlarged substantially 5 times, and thereafter, the respective pixels are narrowed to about 5 μm by the lens systems 54, 58.

Figure 7:
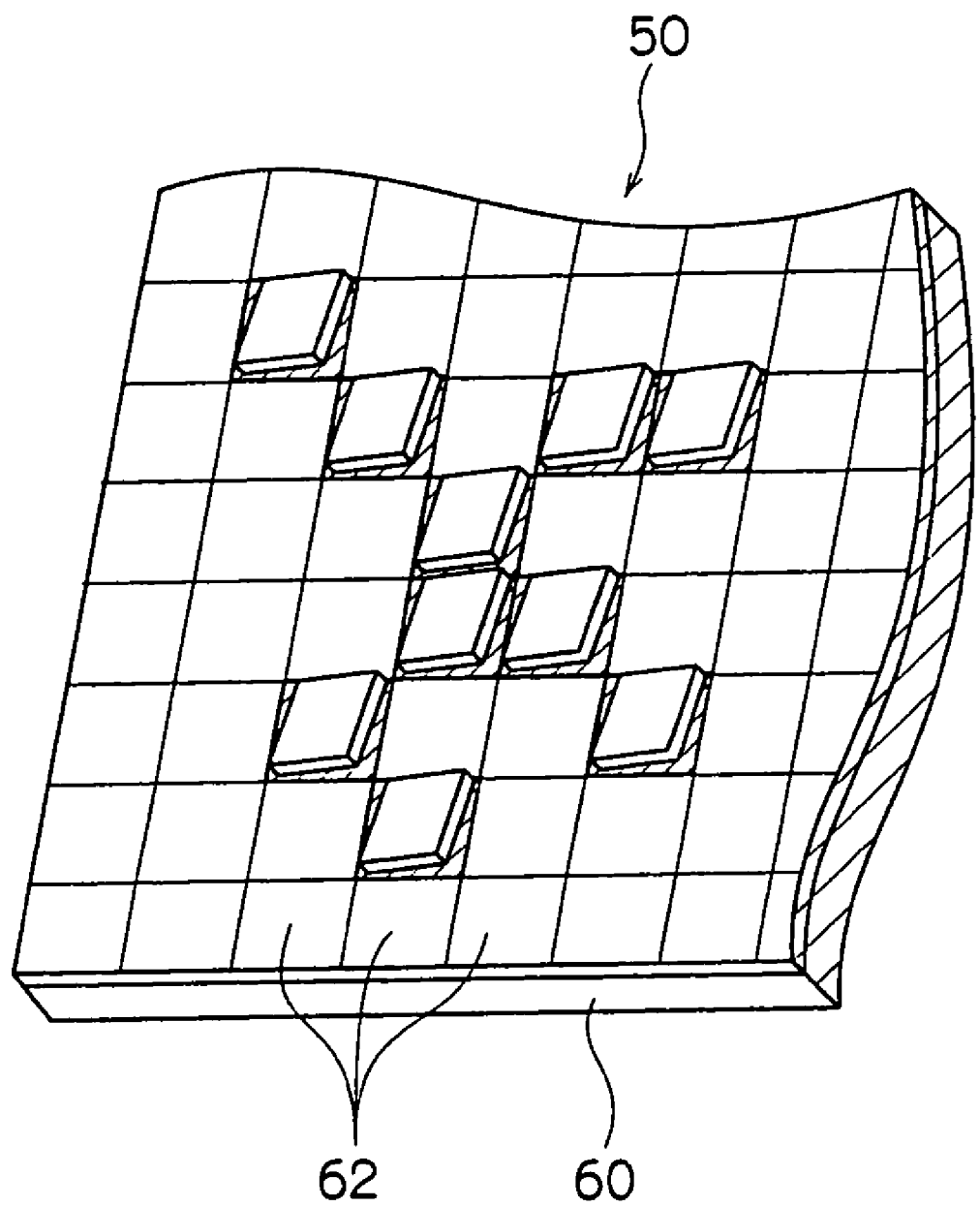
FIG. 7 is a partial enlarged diagram showing the structure of a digital micromirror device (DMD) relating to the exposure head of the embodiment.

As shown in FIG. 7, the DMD 50 is a mirror device in which extremely small mirrors (micromirrors) 62 are disposed on an SRAM cell (a memory cell) 60 so as to be supported by supports, and the large number of extremely small mirrors which structure the pixels are arrayed in the form of a grid. The micromirror 62, whose topmost portion is supported by the support, is provided at each pixel. A material having high reflectivity, such as aluminum or the like, is deposited on the surface of the micromirror 62. The reflectivity of the micromirror 62 is 90% or more. Further, the SRAM cell 60 of a silicon gate CMOS, which is manufactured on a usual production line for semiconductor memories, is disposed directly beneath the micromirrors 62 via the supports including hinges and yokes, so as to be structured monolithically overall.

Figure 8A:
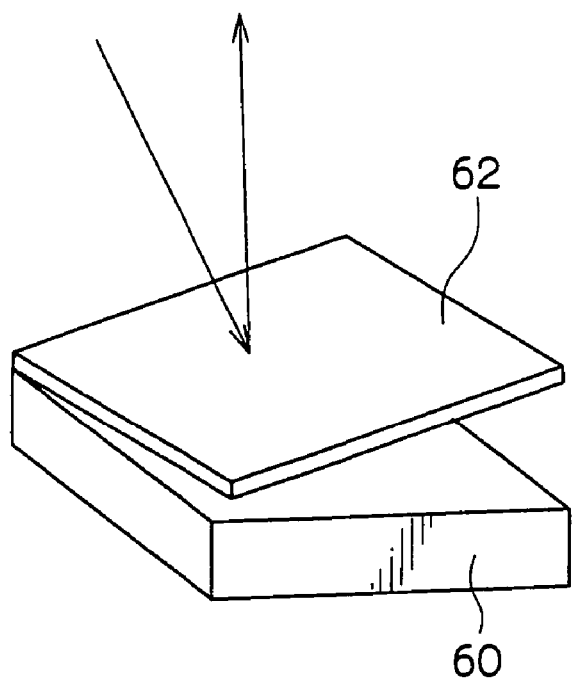
FIGS. 8A and 8B are diagrams for explanation of the operation of the DMD relating to the exposure head of the embodiment.
Figure 8B:
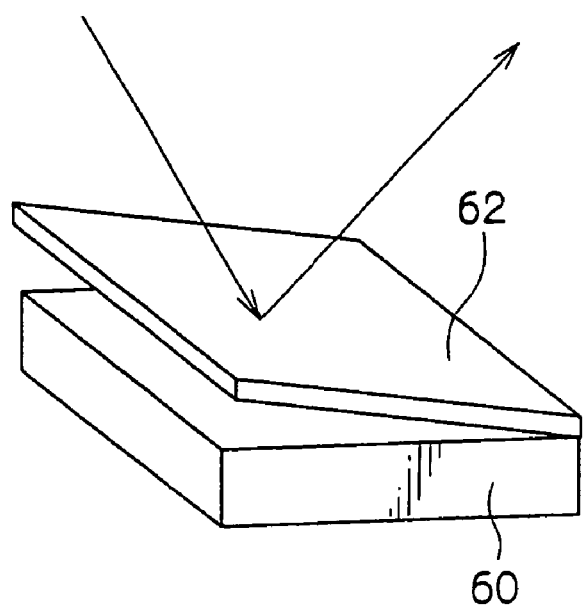

When digital signals are written to the SRAM cell 60 of the DMD 50, the micromirrors 62, which are supported by the supports, are tilted, around diagonal lines, within a range of $\pm\alpha°$ (e.g., $\pm 10°$) with respect to the base on which the DMD 50 is disposed. FIG. 8A illustrates a state in which the micromirror 62 is tilted by $+\alpha°$ which is the on state. FIG. 8B illustrates a state in which the micromirror 62 is tilted by $-\alpha°$ which is the off state. Accordingly, by controlling, as shown in FIG. 8, the inclinations of the micromirrors 62 at the respective pixels of the DMD 50 in accordance with the image signal, the light incident on the DMD 50 is reflected in the directions of tilting of the respective micromirrors 62.

In FIGS. 8A and 8B, a portion of the DMD 50 is enlarged, and FIGS. 8A and 8B show examples of states in which the micromirror 62 is controlled to $+\alpha°$ and $-\alpha°$. The on/off control of the respective micromirrors 62 is carried out by the mirror control signals from the controller 52. A light absorbing body (not shown) is disposed in the direction in which the light beams are reflected by the micromirrors 62 which are in their off states.

Here, description will be given of the arrangement of the micromirrors 62 and exposure onto the photosensitive material 150 in the present embodiment. Note that concrete numerical values will be used in the present embodiment for better understanding, but the present invention is not limited to the numerical values exemplified herein.

Figure 9:
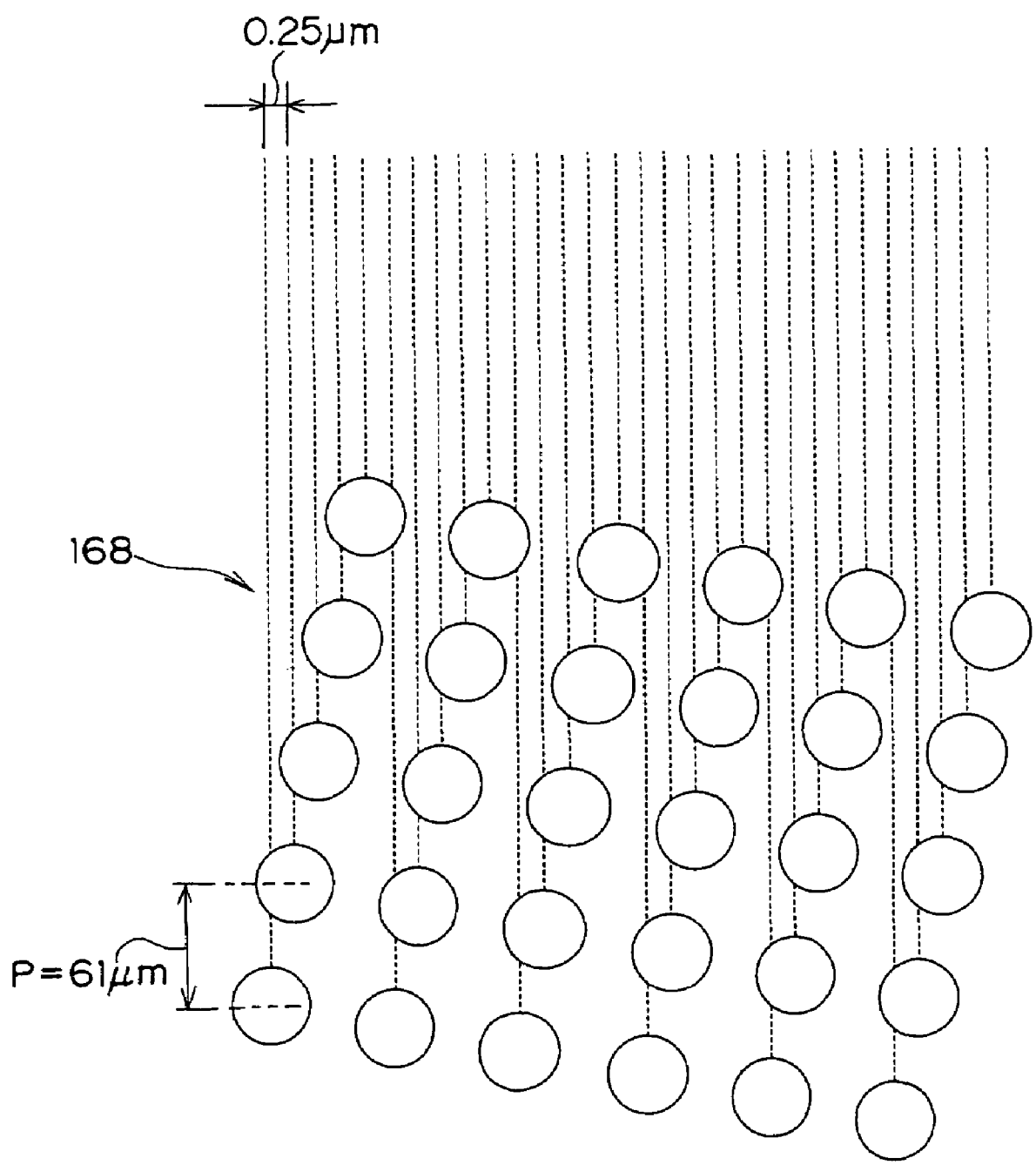
FIG. 9 is a drawing showing exposure positions exposed by one DMD of the embodiment.

A portion of the exposure area 168 obtained by one DMD 50 is shown in FIG. 9. The DMD 50 is structured by 1024×256 of the micromirrors 62 being lined-up in the form of a grid at predetermined pitches. The exposure beams reflected at the DMD 50 are, by the lens systems 54, 58, focused on the photosensitive material 150 at a predetermined magnification such that the pixel pitch is 61 μm. The DMD 50 is inclined at a predetermined angle with respect to the scanning direction X. In this way, the pitch between lines of the loci of scanning of the exposure beams is 0.25 μm. The moving speed of the stage 152 (hereinafter called the "scanning speed V") is set by the controller 52 to be 40 mm/s, and the modulation time T (modulation period) of the DMD 50 is set by the controller 52 to be 50 µsec.

Figure 10:
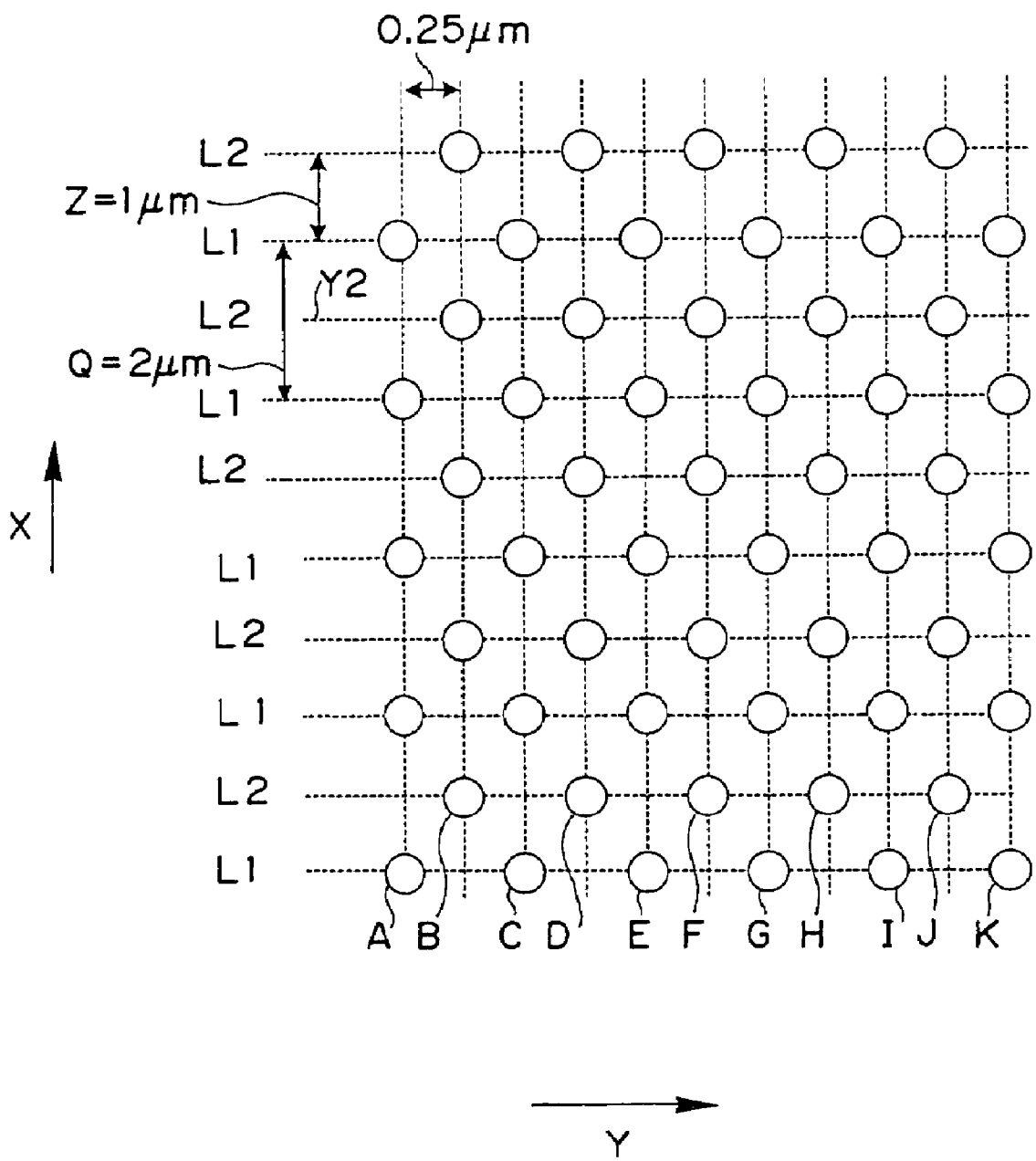
FIG. 10 is a drawing showing a portion of an exposure region exposed by the DMD of the embodiment.

A portion of the photosensitive material 150 which has been exposed by the DMD 50 is shown in FIG. 10. (However, the actual exposure diameter is greater than is shown in the figure.) The exposure distance during one modulation (which will be called the "exposure pitch Q" hereinafter and which corresponds to the image-drawing pitch in the present invention) is expressed as:

$$\text{exposure pitch } Q = \text{scanning speed } V \times \text{modulation time } T \quad (1)$$

The exposure pitch Q here is 40 mm/s×50 µsec=2 µm. Accordingly, the minimum unit in the scanning direction which can be exposed by one scan line is 2 µm.

The exposure magnification B of the exposure device (which corresponds to the image-drawing magnification in the present invention) is expressed as:

$$\text{exposure magnification } B = \text{pixel pitch } P/\text{exposure pitch } Q \quad (2)$$

The exposure magnification B here is 61 µm/2 µm=30.5, and has a number of 0.5 after the decimal point. In the present embodiment, the exposure magnification B must be set so as to have a number M after the decimal point, i.e., so that the pixel pitch P cannot be divided by the exposure pitch Q without a remainder. The setting of the exposure magnification B can be carried out by adjusting at least one of the pixel pitch P and the exposure pitch Q. The changing of the pixel pitch P can be carried out by changing the focusing magnifications of the lens systems 54 and 58 by the controller 52. Further, the changing of the exposure pitch Q can be effected by carrying out at least one of varying the scanning speed V of the stage 152 by the controller 52 and varying the modulation time T of the DMD 50 by the controller 52. Note that in a case in which only the same scanning speed V can be set for the plural exposure heads 166 as in the present embodiment, it is difficult to set the exposure magnification B by changing the scanning speed V. This is because the same pixel pitch change ratio cannot be obtained for all of the exposure heads 166 by changing the scanning speed, because the focusing magnifications of the lens systems 54 and 58 differ slightly at each of the exposure heads 166.

Figure 11:
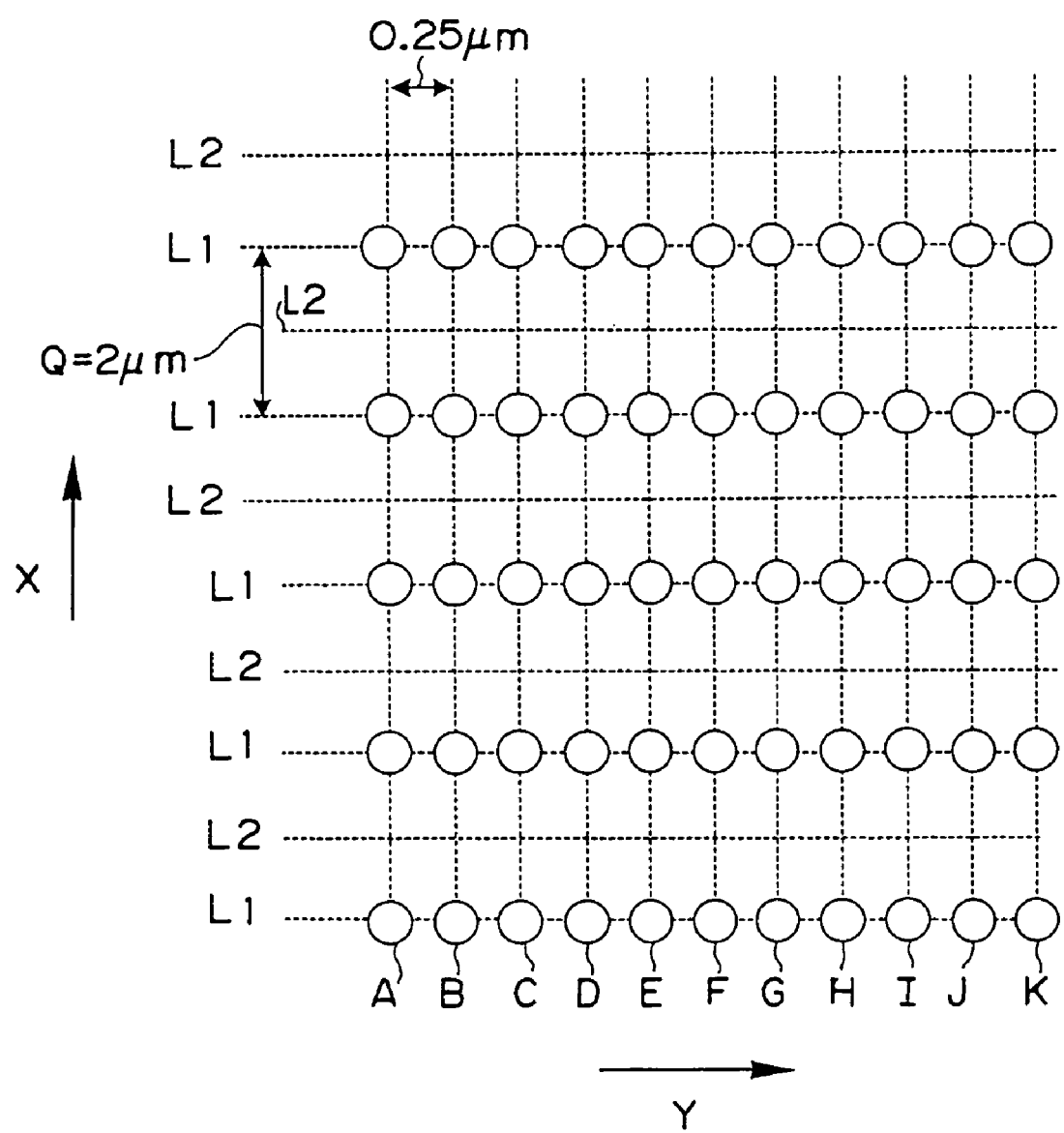
FIG. 11 is a drawing showing a portion of an exposure region in a case in which exposure is carried out with the exposure magnification being an integer.

In this way, when the exposure magnification B has a number M after the decimal point, pixels which are adjacent to one another in the subscanning direction Y are not lined-up along the subscanning direction Y, and are offset in the scanning direction X. Namely, if there is no number M after the decimal point, as shown in FIG. 11, the pixels exposed at the respective micromirrors 62 are lined-up in one row in the subscanning direction. (The pixels are A, B, C, D . . . in order from the left end column.) However, if there is a number after the decimal point, for example, the pixel A exposed by micromirror 62A is offset by Z from the pixel B exposed by micromirror 62B. This offset amount Z is expressed as:

$$\text{offset amount } Z = \text{exposure pitch } Q \times \text{number M after the decimal point} \quad (3)$$

Figure 12A:
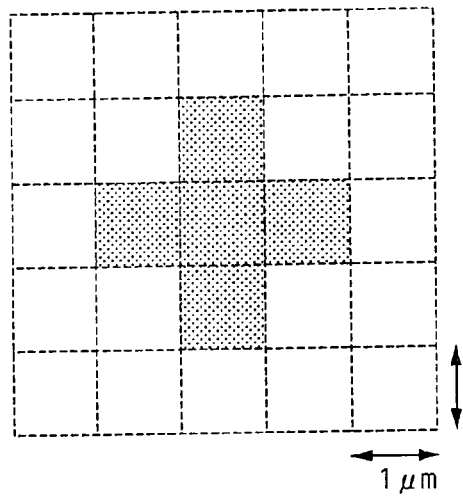
FIG. 12A, 12B, 12C, and 12D is an example of image forming by allocating pixels exposed in the embodiment to given input image data.
Figure 12B:
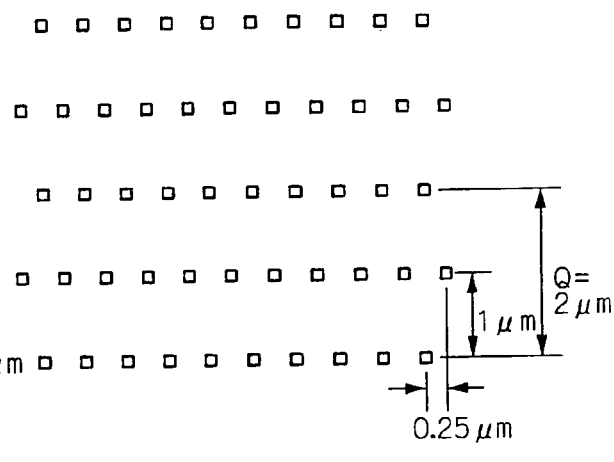
Figure 12C:
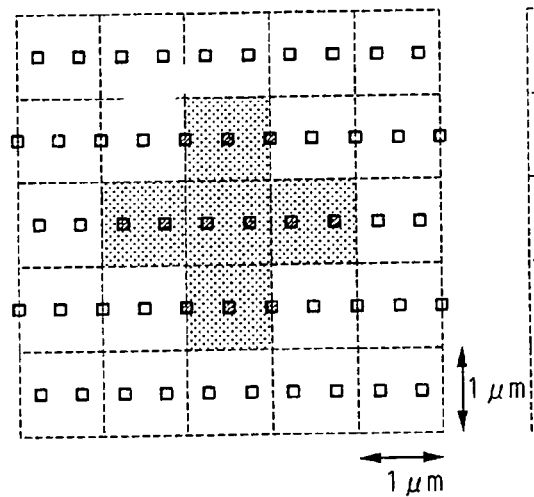
Figure 12D:
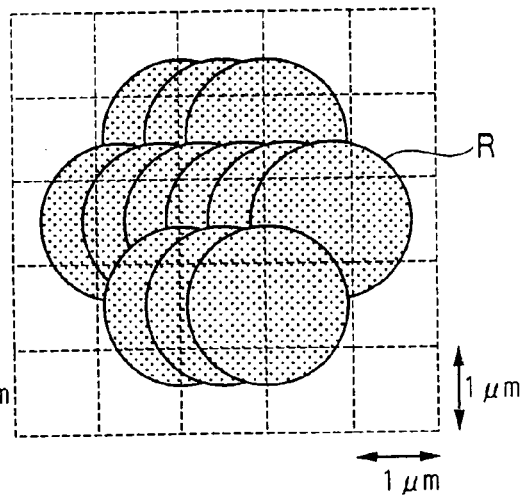

The offset amount Z here is 2 µm×0.5=1 µm. Accordingly, here, every other pixel A, C, E . . . is lined up on a subscan line L1, and every other pixel B, D, F . . . is lined up on a subscan line L2. Namely, every other pixel in the subscanning direction Y is lined up in the subscanning direction Y. The interval between the subscan lines L1 and L2 is 1 µm. Accordingly, in the scanning direction X, image formation at a minimum unit of 1 µm can be carried out. (Note that, if there is no number after the decimal point, as shown in FIG. 11, the interval between the subscan lines L is 2 µm, and in the scanning direction X, it is only possible to carry out exposure at a minimum unit of 2 µm.) Thus, in the present embodiment, the micromirrors 62 are driven by allocating the image data in consideration of the interval between the subscan lines L1, L2. For example, for image data D such as shown in FIG. 12A (in which the minimum image structural unit is 1 µm, and there is exposure at the dotted portions and no exposure at the white portions), if the image is formed by the pixels in the present embodiment (see FIG. 12B), the image data is allocated such that the pixels shown by the black dots in FIG. 12C are exposed. Because the actual exposure diameter is usually greater than the exposure pitch Q, as shown in FIG. 12D, the respective exposure regions R overlap one another. The allocating of the image data is carried out by the controller 52. In this way, high-resolution exposure can be carried out within a range in which adjustment of the exposure pitch Q is limited. Further, if the resolution is the same, exposure can be carried out at a higher speed.

The structure of the fiber array light source 66 is shown in FIG. 13A. The fiber array light source 66 has a plurality (e.g., six) laser modules 64. One end of a multimode optical fiber 30 is connected to each of the laser modules 64. Optical fibers 31 are connected to the other ends of the multimode optical fibers 30. The core diameter of the optical fiber 31 is the same as that of the multimode optical fiber 30, and the clad diameter of the optical fiber 31 is smaller than that of the multimode optical fiber 30. As shown in FIG. 13C, a laser exiting portion 68 is structured by the light exiting end portions (the light-emitting points) of the optical fibers 31 being lined-up in one row along the main scanning direction which is orthogonal to the subscanning direction. Note that, as shown in FIG. 13D, the light-emitting points of the optical fibers 31 may be lined-up in two rows along the main scanning direction.

As shown in FIG. 13B, the light exiting end portions of the optical fibers 31 are nipped and fixed between two supporting plates 65 whose surfaces are flat. Further, a protective plate 63, which is transparent and made of glass or the like, is disposed at the light exiting side of the optical fibers 31 so as to protect the end surfaces of the optical fibers 31. The protective plate 63 may be disposed so as to fit tightly to the end surfaces of the optical fibers 31, or may be disposed such that the end surfaces of the optical fibers 31 are sealed. At the light exiting end portions of the optical fibers 31, the light density is high, and it is easy for dust to accumulate thereat, and it is easy for this region to deteriorate. However, by providing the protective plate 63, the adhering of dust to the end surfaces can be prevented, and deterioration can be retarded.

Note that any of a step-index optical fiber, a graded-index optical fiber, and a composite optical fiber can be used as the multimode optical fiber 30 and the optical fiber 31. For example, a step-index optical fiber manufactured by Mitsubishi Cable Industries, Ltd. can be used.

Figure 14:
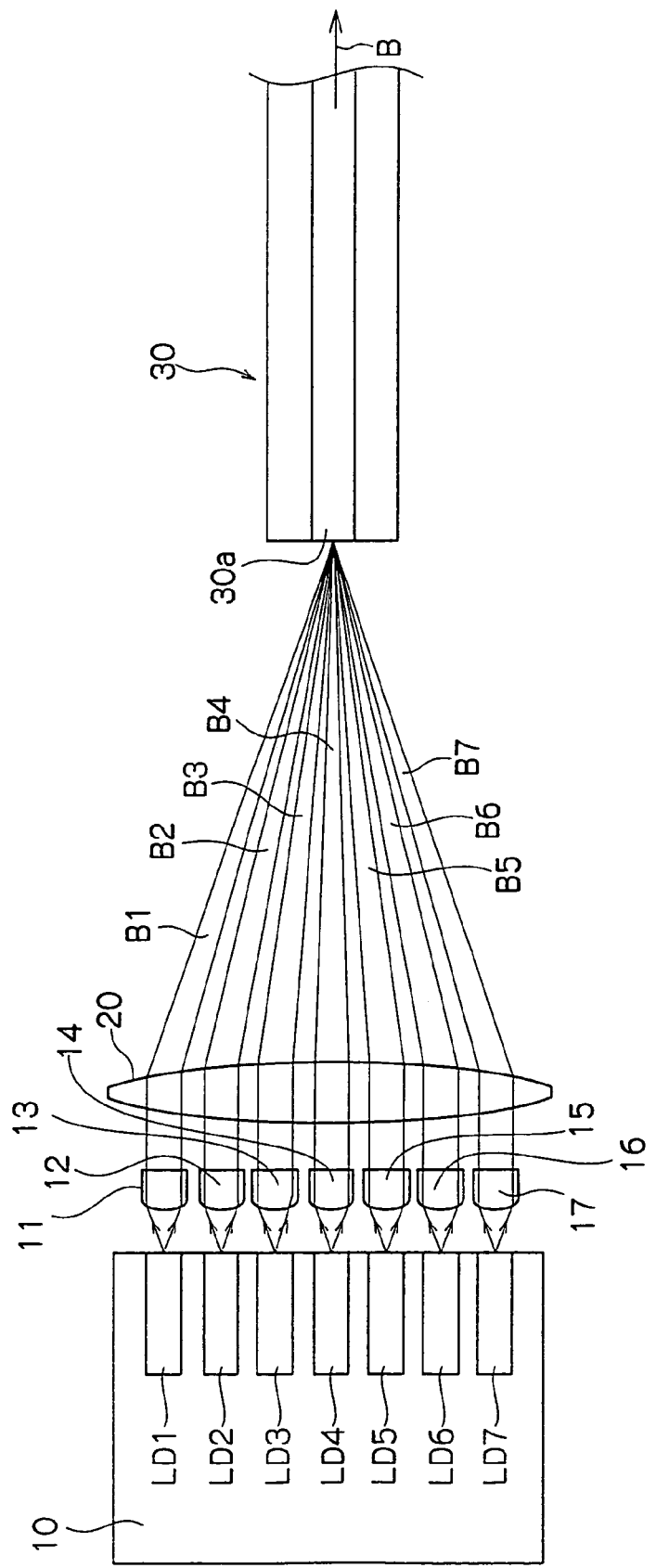
FIG. 14 is a plan view showing the structure of a multiplex laser light source relating to the embodiment.

The laser module 64 is structured by the multiplex laser light source (fiber light source) shown in FIG. 14. This multiplex laser light source is structured by a plurality of (e.g., seven) chip-like transverse multimode or single-mode GaN semiconductor lasers LD1, LD2, LD3, LD4, LD5, LD6, LD7 which are fixed so as to be lined-up on a heat block 10; collimator lenses 11, 12, 13, 14, 15, 16, 17 which are provided so as to correspond respectively to the GaN semiconductor lasers LD1 through LD7; a single condenser lens 20; and a single multimode optical fiber 30. Note that the number of semiconductor lasers is not limited to seven.

The oscillation wavelengths of the GaN semiconductor lasers LD1 through LD7 are all the same (e.g., 405 nm), and the maximum outputs thereof are all the same (e.g., 100 mW for a multimode laser, and 30 mW for a single-mode laser). Note that lasers in a wavelength range of 350 nm to 450 nm whose oscillation wavelength is other than the aforementioned 405 nm may be used as the GaN semiconductor lasers LD1 through LD7.

Figure 15:
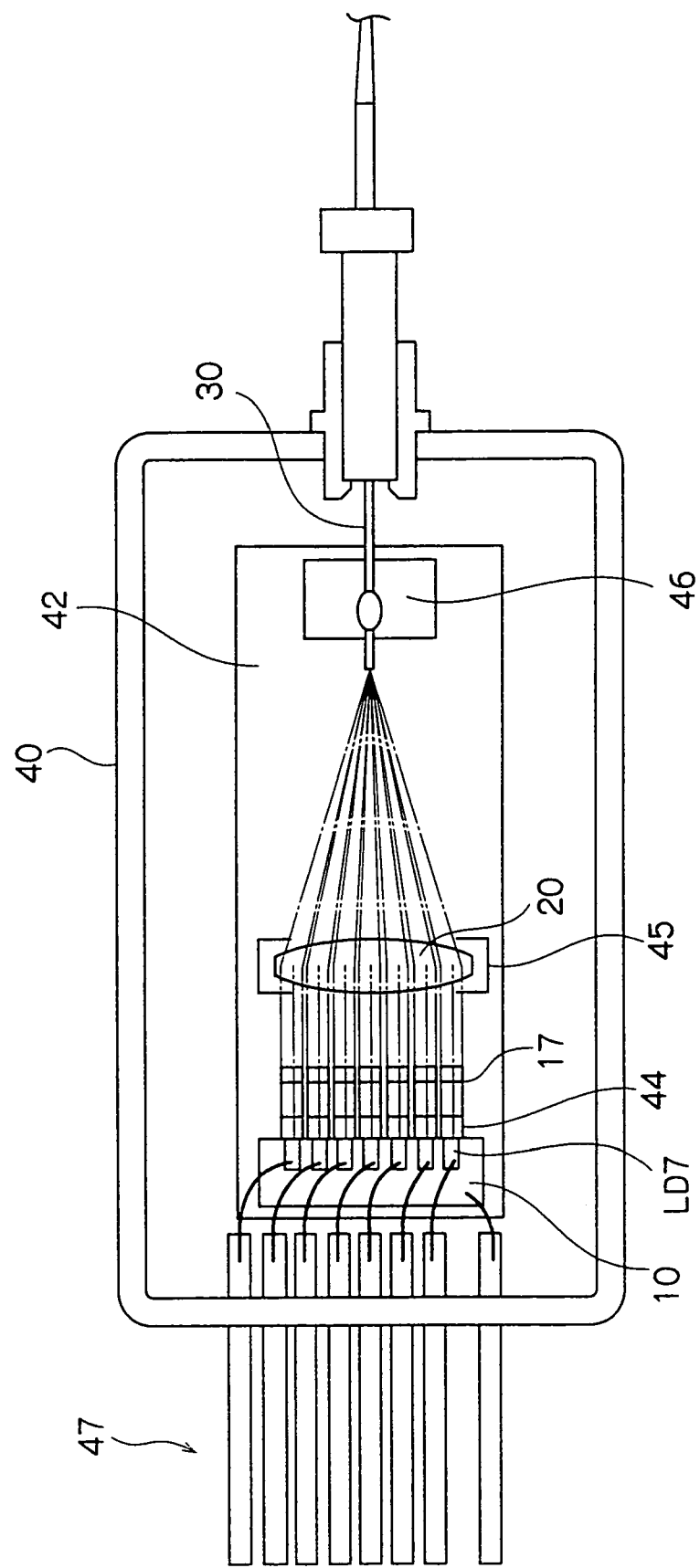
FIG. 15 is a plan view showing the structure of a laser module relating to the embodiment.
Figure 16:
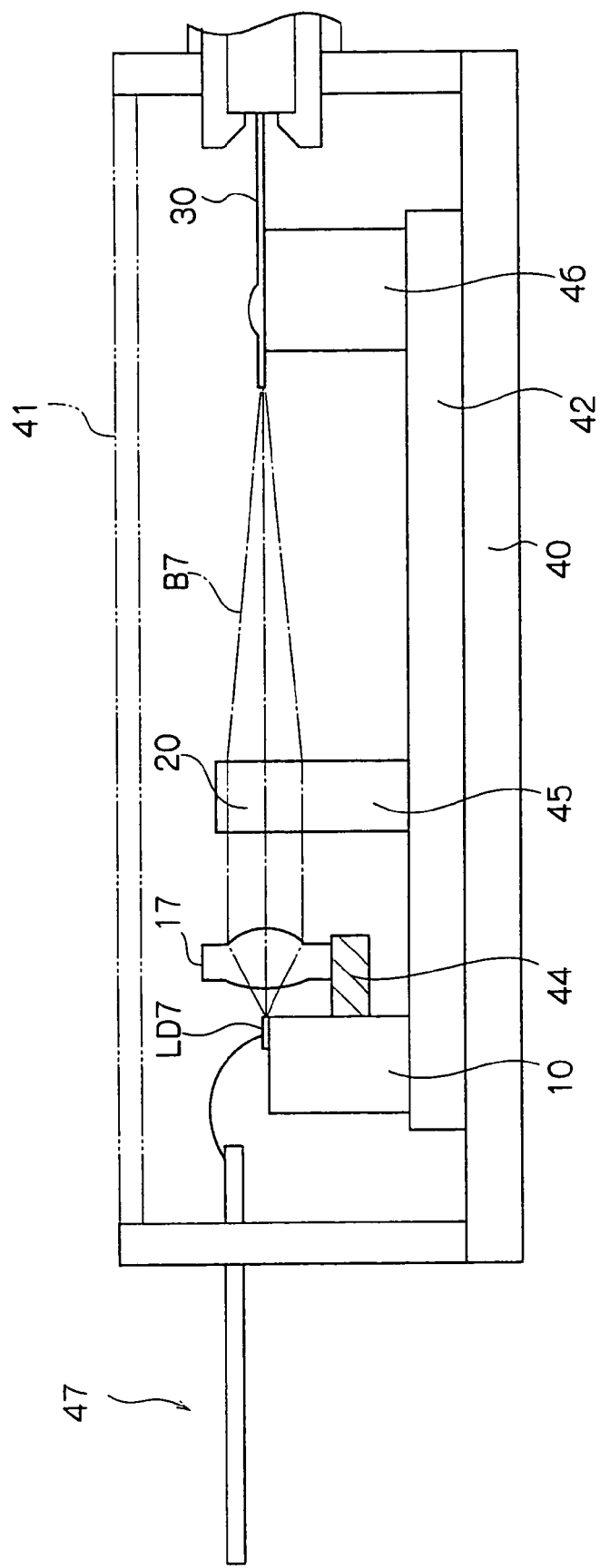
FIG. 16 is a side view showing the structure of the laser module shown in FIG. 15.

As shown in FIGS. 15 and 16, the above-described multiplex laser light source is housed, together with other optical elements, within a package 40 which is shaped as a box and whose top is open. The package 40 has a package cover 41 which is formed so as to close this opening. After deaerating processing is carried out, sealing gas is introduced in, and the opening of the package 40 is closed by the package cover 41. In this way, the above-described multiplex laser light source is sealed airtight within the closed space (sealed space) formed by the package 40 and the package cover 41.

A base plate 42 is fixed to the floor surface of the package 40. The heat block 10, a condenser lens holder 45 which holds the condenser lens 20, and a fiber holder 46 which holds the light incident end portion of the multimode optical fiber 30, are mounted to the top surface of the base plate 42. The light exiting end portion of the multimode optical fiber 30 is pulled out to the exterior of the package from an opening formed in a wall surface of the package 40.

A collimator lens holder 44 is mounted to a side surface of the heat block 10, and the collimator lenses 11 through 17 are held thereat. An opening is formed in a side wall surface of the package 40, and wiring 47, which supplies driving electric current to the GaN semiconductor lasers LD1 through LD7, is pulled-out through this opening to the exterior of the package.

Note that, in FIG. 16, in order to avoid complicating the drawing, a reference numeral is shown for only the GaN semiconductor laser LD7 among the plural GaN semiconductor lasers, and a reference numeral is shown for only the collimator lens 17 among the plural collimator lenses.

Figure 17:
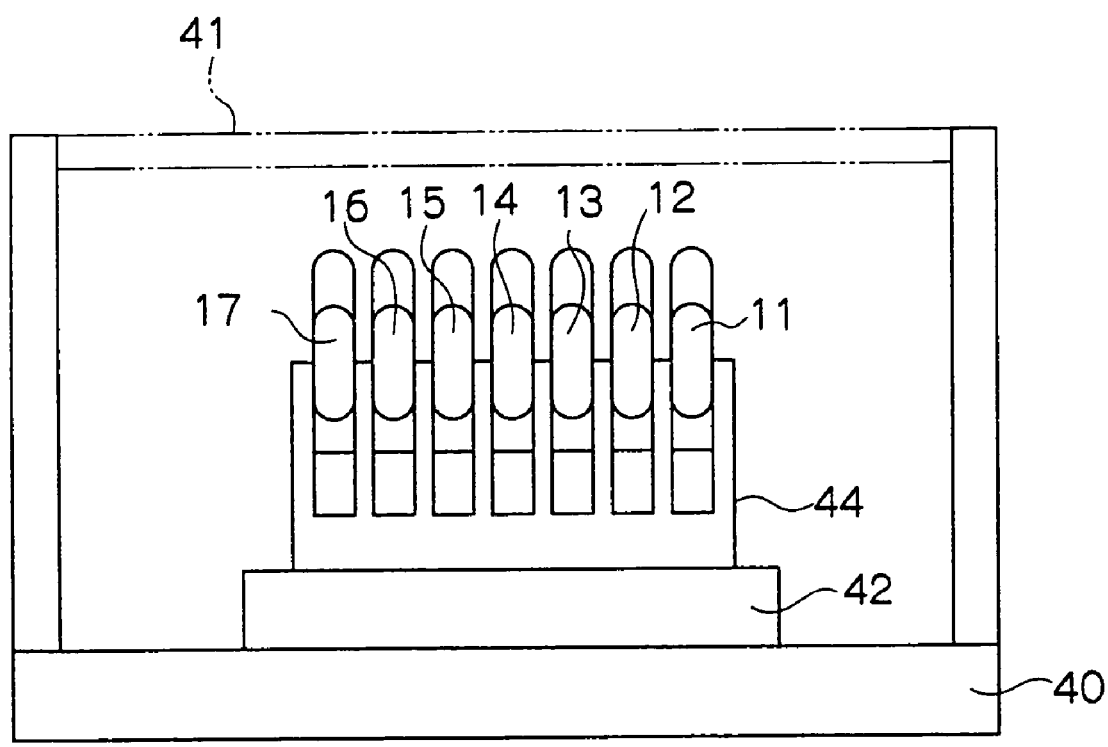
FIG. 17 is a partial side view showing the structure of the laser module shown in FIG. 15.

The configuration, in front view, of the mounting portions of the collimator lenses 11 through 17 is shown in FIG. 17. Each collimator lens 11 through 17 is formed in a configuration such that a region, which includes the optical axis of a circular lens having an aspherical surface, is cut out along parallel planes so as to have a long and narrow shape. These long, narrow collimator lenses can be formed by molding, for example, resin or optical glass. The collimator lenses 11 through 17 are disposed so as to tightly contact one another in the direction in which the light-emitting points of the GaN semiconductor lasers LD1 through LD7 are lined-up (the left-right direction in FIG. 17), such that the lengthwise directions of the collimator lenses 11 through 17 are orthogonal to the direction in which the light-emitting points are lined-up.

Lasers, which have active layers of light-emitting widths of 2 μm and which emit respective laser beams B1 through B7 in a state in which the spread angles in the direction parallel to the active layer and the direction orthogonal to the active layer are, for example, 10° and 30° respectively, are used as the GaN semiconductor lasers LD1 through LD7. These GaN semiconductor lasers LD1 through LD7 are disposed such that the light-emitting points thereof are lined-up in one row in the direction parallel to the active layers.

Accordingly, the laser beams B1 through B7 emitted from the respective light-emitting points are incident on the respective collimator lenses 11 through 17 which are long and narrow as described above, in a state in which the directions in which the spread angles are large coincide with the lengthwise directions, and the directions in which the spread angles are small coincide with the widthwise directions (the directions orthogonal to the lengthwise directions).

The condenser lens 20 is formed in a configuration which is long in the direction in which the collimator lenses 11 through 17 are lined-up (i.e., the horizontal direction) and is short in the direction orthogonal thereto, by a region, which includes the optical axis of a circular lens having an aspherical surface, being cut-out along parallel planes so as to have a long and narrow shape. A lens of, for example, focal length f2=23 mm and NA=0.2 can be used as the condenser lens 20. The condenser lens 20 also can be formed by molding resin or optical glass for example.

Next, operation of the above-described exposure device will be described.

At the respective exposure heads 166 of the scanner 162 shown in FIGS. 1 and 3, as shown in FIG. 14, each of the laser beams B1, B2, B3, B4, B5, B6, B7, which are emitted as scattered light from the respective GaN semiconductor lasers LD1 through LD7 structuring the multiplex laser light source of the fiber array light source 66, is transformed into parallel rays by the corresponding collimator lens 11 through 17. Then, the laser beams B1 through B7 which have been made into parallel rays are condensed by the condenser lens 20, and are converged at the light incident end surface of a core 30a of the multimode optical fiber 30.

In the present example (see FIG. 13), the condensing optical system is structured by the collimator lenses 11 through 17 and the condenser lens 20. The multiplex optical system is structured by this condensing optical system and the multimode optical fiber 30. Namely, the laser beams B1 through B7, which are condensed by the condenser lens 20 as described above, are incident on the core 30a of the multimode optical fiber 30 and propagate through the interior of the optical fiber, and are synthesized into a single laser beam B. The laser beam B exits from the optical fiber 31 which is coupled to the light exiting end portion of the multimode optical fiber 30.

In this way, high-intensity light-emitting points are lined up in one row along the main scanning direction at the laser exiting portion 68 of the fiber array light source 66. A conventional fiber light source, in which the laser light from a single semiconductor laser is coupled to a single optical fiber, has low output. Therefore, a desired output cannot be obtained unless the fiber light sources are lined-up in a large number of rows. However, because the multiplex laser light source used in the present embodiment is high output, the desired output can be obtained by a small number of rows, e.g., even by one row.

The image data corresponding to the exposure pattern is inputted to the controller 52, and is once stored in a frame memory within the controller 52. This image data is data which binarily expresses (i.e., expresses by the absence/presence of exposure) the density of each pixel forming the image. The minimum structural unit of the image is assumed to be 1 μm (see FIG. 2).

The stage 152, which is sucking the photosensitive material 150 at the surface thereof, is moved at a predetermined speed from the upstream side to the downstream side of the gate 160 along the guides 158 by the stage driving section 153. When the leading end of the photosensitive material 150 is detected by the detecting sensors 164 mounted to the gate 160 while the stage 152 passes under the gate 160, within the controller 52, the image data stored in the frame memory is successively read-out in amounts of plural lines (i.e., plural lines-by-plural lines), and mirror control signals are generated for each of the exposure heads 166. As shown in FIG. 12C, the mirror control signals at this time are generated such that one image data is allocated to a pixel of a 1 $\mu m^2$ region. Then, on the basis of the generated mirror control signals, the respective micromirrors of the DMD 50 are driven on and off for each exposure head 166 by the mirror driving section 51.

When laser light is illuminated from the fiber array light source 66 to the DMD 50, the laser light reflected when the micromirrors of the DMD 50 are in an on state is imaged on the surface-to-be-exposed 56 of the photosensitive material 150 by the lens systems 54, 58. In this way, the laser light exiting from the fiber array light source 66 is turned on or off on a pixel-by-pixel basis, and the photosensitive material 150 is exposed in units of pixels of substantially the same number as the number of pixels used at the DMD 50 (the exposure areas 168).

Due to the photosensitive material 150 being moved at a predetermined speed together with the stage 152, the photosensitive material 150 is scanned by the scanner 162 in the direction opposite to the stage moving direction, and the strip-shaped exposed regions 170 are formed by the respective exposure heads 166 (see FIG. 3).

At this time, in the present embodiment, the interval between the subscan lines A and B is 1 μm, and one image data is allocated to a pixel of a region which is 1 $\mu m^2$. Therefore, an image whose minimum structural unit is 1 $\mu m^2$ can be formed.

Note that, in the above-description, explanation is given of an example in which the number M after the decimal point of the exposure magnification B is 0.5. However, the number M after the decimal point is not limited to this value. For example, the pixel pitch P and the exposure pitch Q can be set as shown in Table 1. The "minimum unit in scanning direction" in Table 1 corresponds to the interval between the subscan lines L shown in FIG. 10.

TABLE 1

| pixel pitch (μm) | exposure pitch Q (μm) | minimum unit in scanning direction (μm) |
|---|---|---|
| 60.00 | 2 | 2.00 |
| 61.00 | 2 | 1.00 |
| 60.50 | 2 | 0.50 |
| 60.25 | 2 | 0.25 |
| 60.10 | 2 | 0.10 |

Among these values, when the number M after the decimal point of the exposure magnification B is 0.25 for example, as shown in FIG. 18, subscan lines L1 through L4 of four patterns of intervals of 0.5 μm are formed within 2 μm of the scanning direction X. Accordingly, by allocating image data at an interval of 0.5 μm with respect to the scanning direction X, an image whose minimum structural unit is 0.5 μm can be formed.

Figure 19:
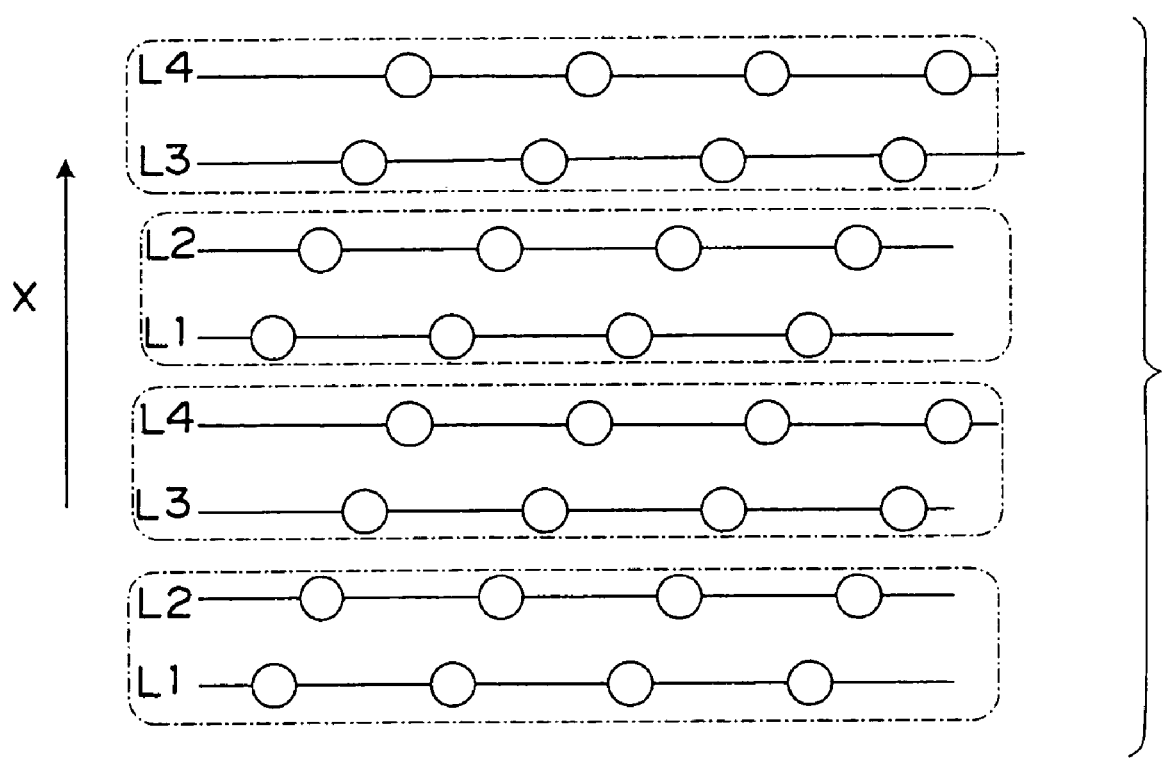
FIG. 19 is a drawing showing an example of grouping predetermined pixels of the exposure region of FIG. 18.
Figure 20:
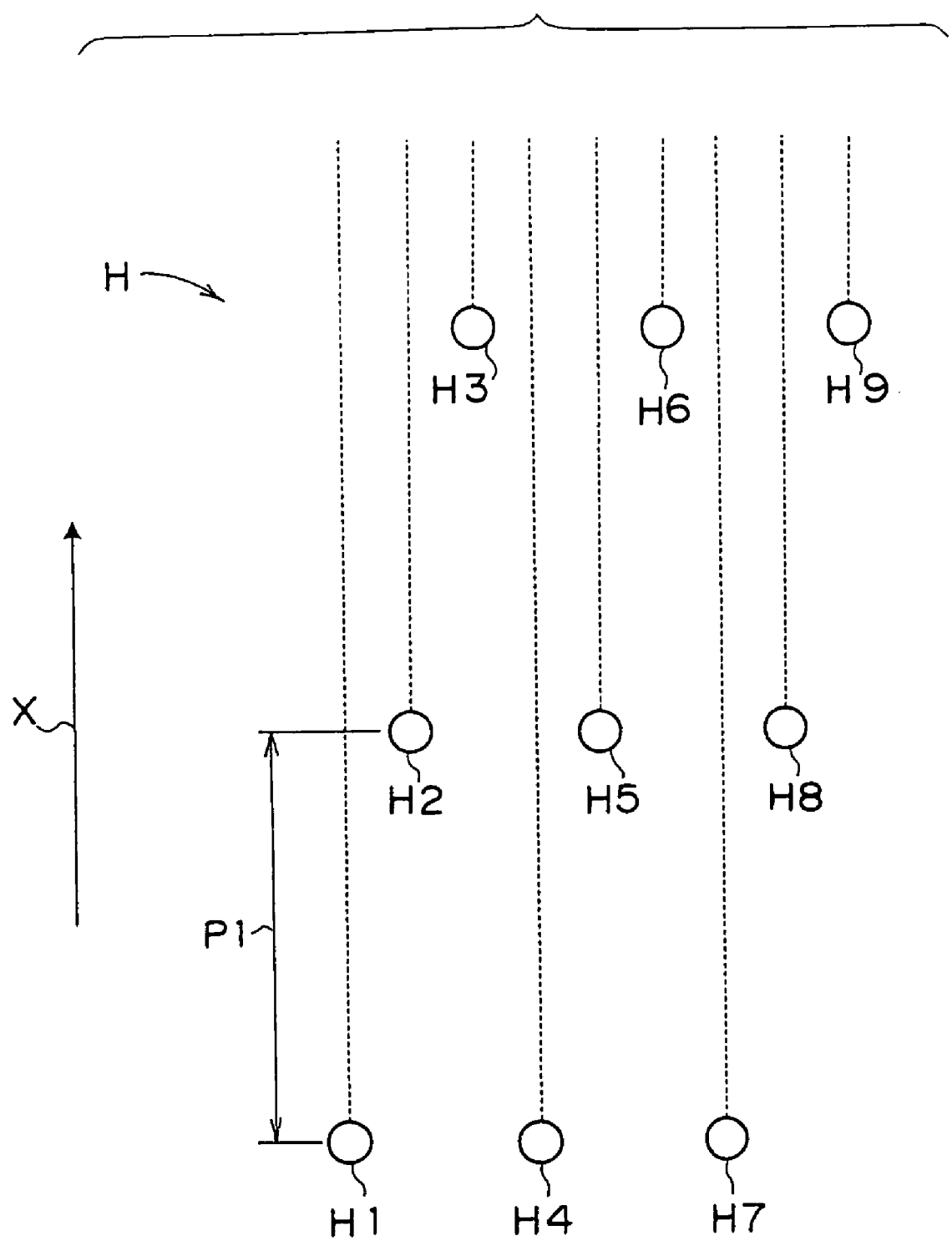
FIG. 20 is a drawing showing projection positions H at the time of projecting a plurality of image-drawing elements onto a surface to be drawn.
Figure 21:
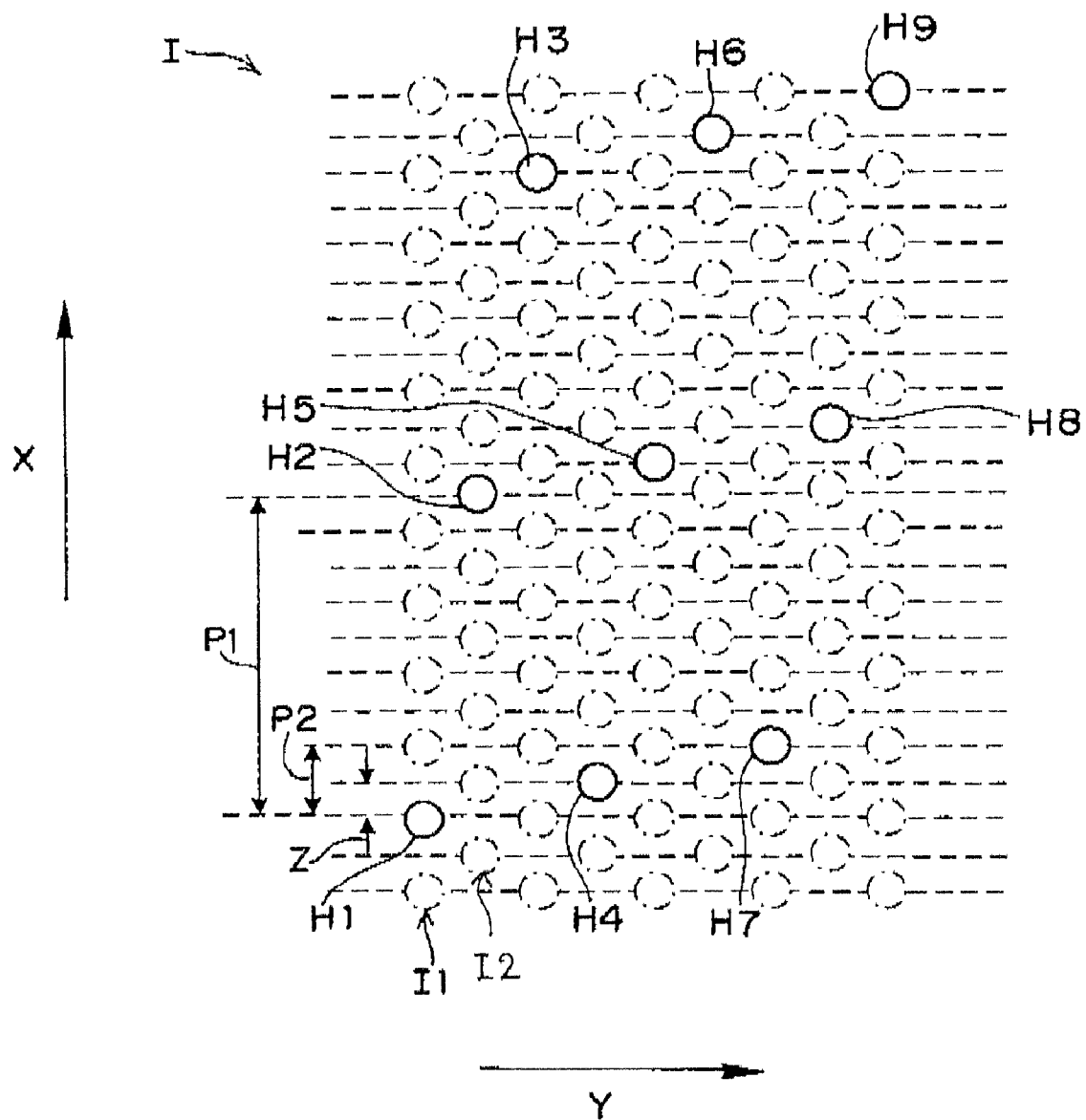
FIG. 21 is a drawing showing the exposure pitch in a case in which the present invention is applied.
Figure 22:
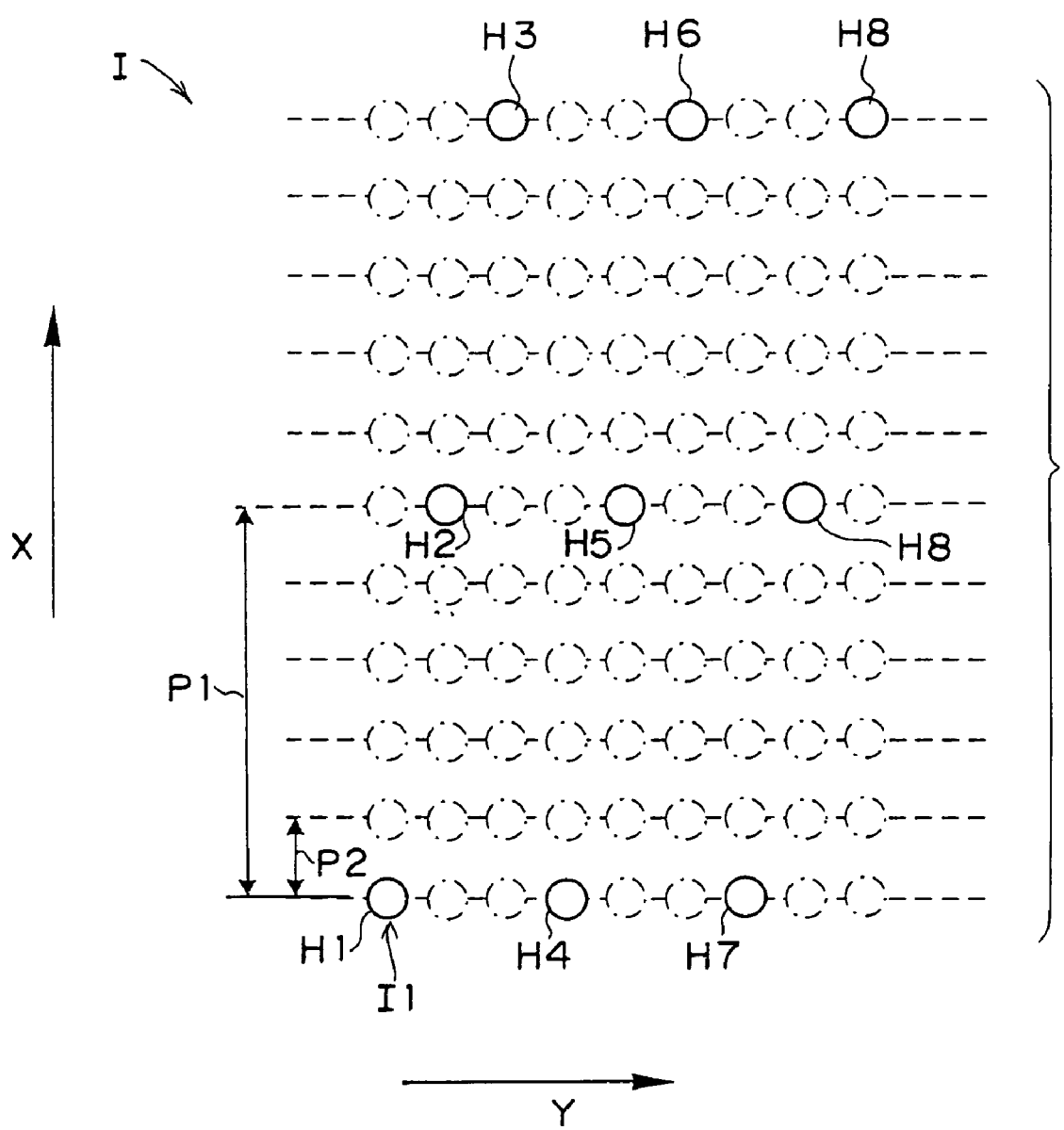
FIG. 22 is a drawing showing the exposure pitch in a case in which the present invention is not applied.

Further, even in a case in which the number after the decimal point of the exposure magnification B is 0.5, when the minimum unit in the scanning direction X of the image data is 1 μm, as shown in FIG. 19, subscan lines L1, L2 formed within the regions shown by the one-dot-chain lines are treated as one group, and subscan lines L3, L4 are treated as another one group. By carrying out grouping in this way and allocating predetermined image data to the set of pixels in one group, an image having a desired resolution can be formed. Further, by allocating the image data in this way, the image data can be allocated per exposure region which is actually exposed. Therefore, even if some error arises in the exposure magnification and the actual exposure positions are offset, image formation corresponding to the image data can be carried out.

In this way, when scanning of the photosensitive material 150 by the scanner 162 is completed and the trailing end of the photosensitive material 150 is detected by the detecting sensors 164, the stage 152 is returned, by the stage driving section 153 and along the guides 158, to its original point which is furthest upstream of the gate 160, and is again moved at a predetermined speed along the guides 158 from the upstream side of the gate 160 to the downstream side thereof (see FIG. 1).

Description has been given hereinabove of exposure heads having DMDs as spatial light modulators. However, other than such a reflective spatial light modulator, a transmissive spatial light modulator (LCD) can be used. For example, a micro electro mechanical system (MEMS) spatial light modulator (SLM), or a spatial light modulator other than a MEMS type, such as an optical element which modulates transmitted light in accordance with the electrooptical effect (a PLZT element), or a liquid crystal shutter array like a liquid crystal optical shutter (FLC), or the like may be used. Note that "MEMS" collectively refers to minute systems in which micro-sized sensors, actuators and control circuits, which are formed by micromachining techniques based on IC manufacturing processes, are integrated. A MEMS spatial light modulator means a spatial light modulator which is driven by electromechanical operation using static electricity. Moreover, a structure in which a plurality of grating light valves (GLVs) are lined-up in a two-dimensional form can be used. In structures using reflective spatial light modulators (GLVs) and transmissive spatial light modulators (LCDs), a lamp or the like can be used as the light source, rather than the aforementioned laser.

In the above embodiment, description is given of an example using a fiber array light source equipped with a plurality of multiplex laser light sources. However, the laser device is not limited to a fiber array light source in which multiplex laser light sources are arrayed. For example, it is possible to use a fiber array light source in which are arrayed fiber light sources having a single optical fiber emitting laser light which has been incident from a single semiconductor laser having a single light-emitting point.

Further, a light source in which a plurality of light-emitting points are lined-up in two dimensions (e.g., an LD array, an organic EL array, and the like) can also be used. In a structure using such a light source, the spatial light modulators can be eliminated by making each light-emitting point correspond to a pixel.

In the above-described embodiment, a flatbed-type exposure device is used as an example. However, the exposure device of the present invention may be an exposure device having a drum around which a photosensitive material is trained, i.e., a so-called outer drum type exposure device.

Further, the above-described exposure device can be suitably used in applications such as, for example, the exposure of a dry film resist (DFR) in the process of manufacturing a printed wiring board (PWB); the formation of a color filter in the process of manufacturing a liquid crystal display (LCD); the exposure of a DFR in the process of manufacturing a TFT; the exposure of a DFR in the process of manufacturing a plasma display panel (PDP); or the like.

Either of a photon-mode photosensitive material on which information is directly recorded by exposure, or a heat-mode photosensitive material on which information is recorded by heat generated by exposure, may be used in the above-described exposure device. In a case in which a photon-mode photosensitive material is used, a GaN semiconductor laser, a wavelength converting solid state laser, or the like is used as the laser device. Further, in a case in which a heat-node photosensitive material is used, an AlGaAs semiconductor laser (infrared laser) or a solid state laser is used as the laser device.

The present invention is not limited to exposure devices, and can employ a similar structure at, for example, inkjet recording heads. Namely, in inkjet recording heads, generally, the nozzles which expel the ink drops are formed at a nozzle surface which faces the recording medium (e.g., a recording paper or an OHP sheet or the like). Among ink-jet recording heads, there are those in which a plurality of nozzles are disposed in a grid-like form, and the heads themselves are inclined with respect to the scanning direction, and an image can be recorded at a high resolution. In such inkjet recording heads employing two-dimensional arrangements, even if magnification errors in the scanning direction arise between respective inkjet recording heads, the error can be corrected.

Because the present invention has the above-described structure, the resolution in the scanning direction can be increased without making the scanning speed slower or making the modulating speed of an image-drawing element group faster. Further, the image-drawing speed at the same resolution can be made faster.

What is claimed is:

1. An image-drawing device having image-drawing heads which are moved relatively in a predetermined scanning direction along an image-drawing surface, and carrying-out image-drawing on the basis of image-drawing data, the device comprising:

a plurality of image-drawing elements structured so as to be lined-up two-dimensionally within a plane substantially parallel to the image-drawing surface of the image-drawing heads, and at the image-drawing surface, the plurality of image-drawing elements on the whole structure image-drawing element groups which generate two-dimensional image-drawing pixel groups which are inclined at a predetermined angle of inclination with respect to the scanning direction;

an image-drawing magnification setting unit setting an image-drawing magnification such that the image-drawing magnification has an effective value after a decimal point; and a data allocating unit allocating the image-drawing data at predetermined timings to the respective image-drawing elements, so that a resolution becomes a resolution corresponding to the value after the decimal point of the image-drawing magnification, wherein the image-drawing magnification is expressed by a value equal to a pixel pitch in the scanning direction being divided by an image-drawing pitch of the image-drawing elements.

2. The image-drawing device of claim 1, wherein the pixel groups are structured in units of predetermined numbers of pixels in a region to be drawn, which predetermined numbers of pixels are adjacent to one another, and predetermined image-drawing data is allocated to the respective image-drawing elements by the data allocating unit so as to correspond to the pixel groups.

3. The image-drawing device of claim 1, wherein the image-drawing magnification setting unit sets the image-drawing magnification by varying an image-drawing data switching time of the image-drawing elements.

4. The image-drawing device of claim 1, wherein the image-drawing magnification setting unit sets the image-drawing magnification by varying a relative moving speed of the image-drawing heads.

5. The image-drawing device of claim 1, wherein the image-drawing magnification setting unit has a focusing unit which focuses an image-to-be-drawn from the image-drawing elements onto the image-drawing surface at a predetermined magnification, and setting of the image-drawing magnification is carried out by the focusing unit varying a focusing magnification.

6. The image-drawing device of claim 1, wherein the image-drawing heads have modulated light illuminating devices which illuminate onto an exposure surface, which serves as the image-drawing surface, light which has been modulated pixel-by-pixel in accordance with the image-drawing data.

7. The image-drawing device of claim 6, wherein the modulated light illuminating device comprises:

a laser device illuminating laser light;

a spatial light modulator at which a large number of image-drawing elements, whose light modulating states vary in accordance with control signals, are arranged two-dimensionally, and which modulates the laser light illuminated from the laser device; and a control unit supplying, to the respective image-drawing elements of the large number of image-drawing elements, control signals generated in accordance with the image-drawing data.

8. The image-drawing device of claim 7, wherein the spatial light modulator has a micromirror device, and the micromirror device includes a large number of micromirrors, and the large number of micromirrors are lined-up two-dimensionally, and each of the micromirrors varies an angle of a reflecting surface in accordance with a control signal.

9. The image-drawing device of claim 7, wherein the spatial light modulator has a liquid crystal shutter array, and the liquid crystal shutter array is structured by a large number of liquid crystal cells, which respectively block incident light in accordance with a control signal, being lined-up two-dimensionally.

10. An image-drawing method moving image-drawing heads relatively in a predetermined scanning direction along an image-drawing surface, and carrying-out image-drawing on the basis of image-drawing data, the method comprising:

lining-up a plurality of image-drawing elements two-dimensionally and inclined at a predetermined angle of inclination with respect to the scanning direction, within a plane substantially parallel to the image-drawing surface;

setting an image-drawing magnification such that the image-drawing magnification has an effective value after a decimal point; and carrying-out image-drawing by allocating the image-drawing data to pixels to be drawn by the respective image-drawing elements, in accordance with the effective value after the decimal point, wherein the image-drawing magnification is expressed by a value equal to a pixel pitch in the scanning direction being divided by an image-drawing pitch of the image-drawing elements.

11. The image-drawing method of claim 10, wherein pixel groups are structured in units of a predetermined number of pixels in a region to be drawn, which predetermined numbers of pixels are adjacent to one another, and predetermined image-drawing data is allocated to the respective image-drawing elements so as to correspond to the pixel groups.

12. The image-drawing method of claim 10, wherein the image-drawing magnification is set by varying an image-drawing data switching time of the image-drawing elements.

13. The image-drawing method of claim 10, wherein the image-drawing magnification is set by varying a relative moving speed of the image-drawing heads.

14. The image-drawing method of claim 10, wherein the image-drawing magnification is set by varying a focusing magnification for focusing light from the image-drawing elements of the image-drawing heads onto the image-drawing surface.

15. The image-drawing method of claim 10, wherein the image-drawing heads have modulated light illuminating devices which illuminate onto an exposure surface, which serves as the image-drawing surface, light which has been modulated pixel-by-pixel in accordance with the image-drawing data.

16. The image-drawing method of claim 15, wherein the modulated light illuminating device comprises:
   a laser device illuminating laser light;
   a spatial light modulator at which a large number of image-drawing element portions, whose light modulating states vary in accordance with control signals, are lined-up two-dimensionally, and which modulates the laser light illuminated from the laser device; and
   a control unit controlling the image-drawing element portions by control signals generated in accordance with exposure information.

17. The image-drawing method of claim 16, wherein the spatial light modulator has a micromirror device, and the micromirror device includes a large number of micromirrors, and the large number of micromirrors are lined-up two-dimensionally, and each of the micromirrors varies an angle of a reflecting surface in accordance with a control signal.

18. The image-drawing method of claim 16, wherein the spatial light modulator has a liquid crystal shutter array, and the liquid crystal shutter array is structured by a large number of liquid crystal cells, which respectively block incident light in accordance with a control signal, being lined-up two-dimensionally.

19. The image-drawing device of claim 1, wherein the image-drawing magnification corresponds to a quotient having a remainder, and wherein the remainder corresponds to the effective value.

20. The image-drawing method of claim 10, wherein the image-drawing magnification corresponds to a quotient having a remainder, and wherein the remainder corresponds to the effective value.

* * * * *